(12) United States Patent
Jang

(10) Patent No.: US 11,888,171 B2
(45) Date of Patent: Jan. 30, 2024

(54) BATTERY MODULE ASSEMBLY

(71) Applicant: HYUNDAI MOBIS Co., Ltd., Seoul (KR)

(72) Inventor: Jae Young Jang, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 77 days.

(21) Appl. No.: 17/560,906

(22) Filed: Dec. 23, 2021

(65) Prior Publication Data
US 2022/0209353 A1 Jun. 30, 2022

(30) Foreign Application Priority Data

Dec. 24, 2020 (KR) .................. 10-2020-0183879
Dec. 24, 2020 (KR) .................. 10-2020-0183880

(51) Int. Cl.
*H01M 50/262* (2021.01)
*H01M 50/209* (2021.01)
*H01M 50/505* (2021.01)

(52) U.S. Cl.
CPC ....... *H01M 50/262* (2021.01); *H01M 50/209* (2021.01); *H01M 50/505* (2021.01)

(58) Field of Classification Search
CPC ............. H01M 50/209; H01M 50/262; H01M 50/505; H01M 50/503; H01M 50/211
See application file for complete search history.

(56) References Cited

U.S. PATENT DOCUMENTS

| 10,622,688 | B2 | 4/2020 | Kim et al. |
| 10,763,467 | B2 | 9/2020 | Kim et al. |
| 2013/0136970 | A1* | 5/2013 | Kurokawa ......... H01M 50/262 429/99 |
| 2014/0035537 | A1* | 2/2014 | Hong ................ B60L 3/12 320/162 |
| 2020/0176745 | A1* | 6/2020 | Lee ..................... H01M 50/262 |
| 2020/0321590 | A1* | 10/2020 | Park ................. H01M 10/0422 |
| 2021/0344074 | A1* | 11/2021 | Jung ................. H01M 50/593 |
| 2022/0190422 | A1* | 6/2022 | Yamashiro ......... H01M 50/209 |

FOREIGN PATENT DOCUMENTS

| KR | 20190112583 A | * 10/2019 | ......... H01M 2/1072 |
| KR | 10-2030708 B1 | 11/2019 | |
| KR | 10-2019-0138072 A | 12/2019 | |
| KR | 10-2056365 B1 | 12/2019 | |
| KR | 10-2050025 B1 | 1/2020 | |

* cited by examiner

*Primary Examiner* — Brian R Ohara
(74) *Attorney, Agent, or Firm* — NSIP Law

(57) ABSTRACT

A battery module assembly includes a front frame and a rear frame installed on the front and rear surfaces of the cell assembly and configured to mold a bus bar for electrically connecting battery cells included in the cell assembly, a left end plate and a right end plate respectively covering both side surfaces of the cell assembly, an upper clamp and a lower clamp disposed over an upper portion and a lower portion of the cell assembly, respectively clamping an upper portion and a lower portion of each of the left end plate and the right end plate, and pressing both side surfaces of the cell assembly disposed between the left end plate and the right end plate, and a front cover and a rear cover covering the front frame and the rear frame. A long hole formed in an upper portion and a lower portion of the front cover and the rear cover, and a pipe disposed on an inner perimeter surface of the long hole.

6 Claims, 26 Drawing Sheets

BATTERY MODULE ASSEMBLY

CROSS-REFERENCE TO RELATED APPLICATIONS

This application claims the benefit under 35 U.S.C. § 119 to Korean Patent Application Nos. 10-2020-0183879, filed on Dec. 24, 2020, and 10-2020-0183880, filed on Dec. 24, 2020, in the Korean Intellectual Property Office, the entire disclosure of which is incorporated herein by reference for all purposes.

BACKGROUND

1. Field

The following description relates to a battery module assembly, and more particularly, to an electrode structure of a battery module.

2. Discussion of Related Art

FIGS. 1 and 2 are diagrams for describing a battery module assembly of the related art.

Referring to FIGS. 1 and 2, the battery module assembly (BMA) of the related art includes a plurality of battery cells 10 and 60, a pad 20, a cartridge 30, a bus bar 40, and a printed circuit board (PCB) 50.

Each of the battery cells 10 and 60 is configured with an anode plate, a cathode plate, an electrolyte, and a separation membrane and is a minimum configuration unit of a battery. A plurality of electrode lids (or cell taps) 11 and 12 unloaded from the battery cell 10 are provided at both end portions of the battery cell 10. The electrode lids 11 and 12 include a positive electrode lid 11 and a negative electrode lid 12.

The pad 20 is disposed between two battery cells to fix the battery cells, and simultaneously, provides a certain surface pressure so that the battery cells are closely adhered to each other.

The cartridge 30 is disposed between the battery cells 10 and 60 to have a tetragonal frame shape where a center thereof is hollow, so as to fix positions of the battery cells 10 and 60, and is configured with an aluminum cover on which insulation processing has been performed.

The bus bar 40 includes a parallel bus bar (42 of FIG. 1), connecting the electrode lids of the battery cells 10 and 60 in parallel, and a serial bus bar (44 of FIG. 2) which connects the battery cells in series.

The PCB 50 transfers voltage information about the battery cell to the outside, and to this end, a plurality of electronic devices for processing the voltage information about the battery cell are mounted on the PCB 50.

The battery module assembly of the related art needs a separate bus bar for connecting the battery cells in series and parallel and needs a separate cartridge for foxing the battery cells. Also, a soldering process between a bus bar 44 and the PCB 50 is needed.

The separate elements and the soldering process are factors which increase the process (structure) complexity, cost, weight, and size of the battery module assembly.

Moreover, the battery module assembly of the related art is vulnerable to maintaining a surface pressure for preventing a cell swelling phenomenon where a cell swells.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a battery module assembly including a cell assembly including battery cells that are stacked, a front frame and a rear frame installed on the front and rear surfaces of the cell assembly and configured to mold a bus bar assembly for electrically connecting battery cells included in the cell assembly, a left end plate and a right end plate respectively covering both side surfaces of the cell assembly with the cell assembly disposed therebetween, an upper clamp and a lower clamp disposed over an upper portion and a lower portion of the cell assembly, respectively, and being configured to clamp an upper portion and a lower portion of each of the left end plate and the right end plate, respectively and to press the both side surfaces of the cell assembly disposed between the left end plate and the right end plate, a front cover and a rear cover covering the front plate and the rear plate, respectively, a long hole formed in an upper portion and a lower portion of each of the front cover and the rear cover, and a pipe having a cylindrical shape being disposed on an inner perimeter surface of the long hole.

A screw thread may be formed on an inner perimeter surface of both ends of the pipe, a coupling hole may be drilled in a corner portion of each of the left end plate and the right end plate, and a thread of a bolt passing through the coupling hole may be screwed to the screw thread, and the front cover and the rear cover may be coupled to the left end plate and the right end plate by the screwing of the bolt.

The pipe may include a metal material.

Each of the front frame and the rear frame may be manufactured by an insert injection molding process and may include a bus bar connecting the battery cells.

A first coupling hole may be formed in a side surface of each of the front cover and the rear cover, a second coupling hole may be formed in a corner portion of each of the left end plate and the right end plate, and the front cover and the rear cover may be coupled to the left end plate and the right end plate through a coupling member passing through the first and second coupling holes.

Each of the left end plate and the right end plate may include an outer panel including a metal material, and an inner panel may be disposed between a side surface of the cell assembly and the outer panel, and may be configured to insulate the cell assembly with the outer panel.

Other features and aspects will be apparent from the following detailed description, the drawings, and the claims.

Figure 1:
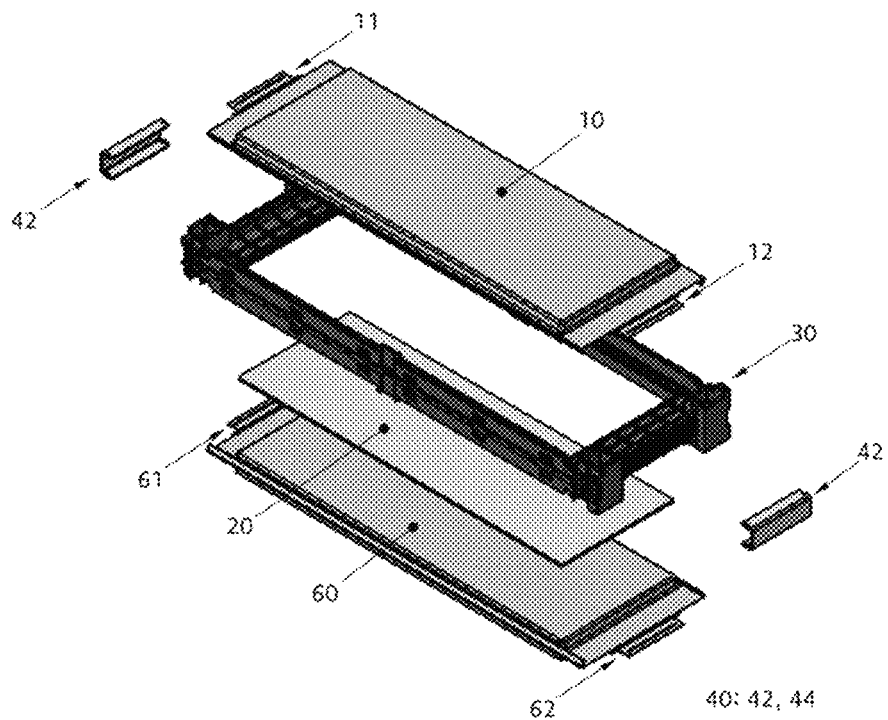
FIGS. 1 and 2 are diagrams for describing a battery module assembly of the related art.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience

DETAILED DESCRIPTION OF EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Figure 3:
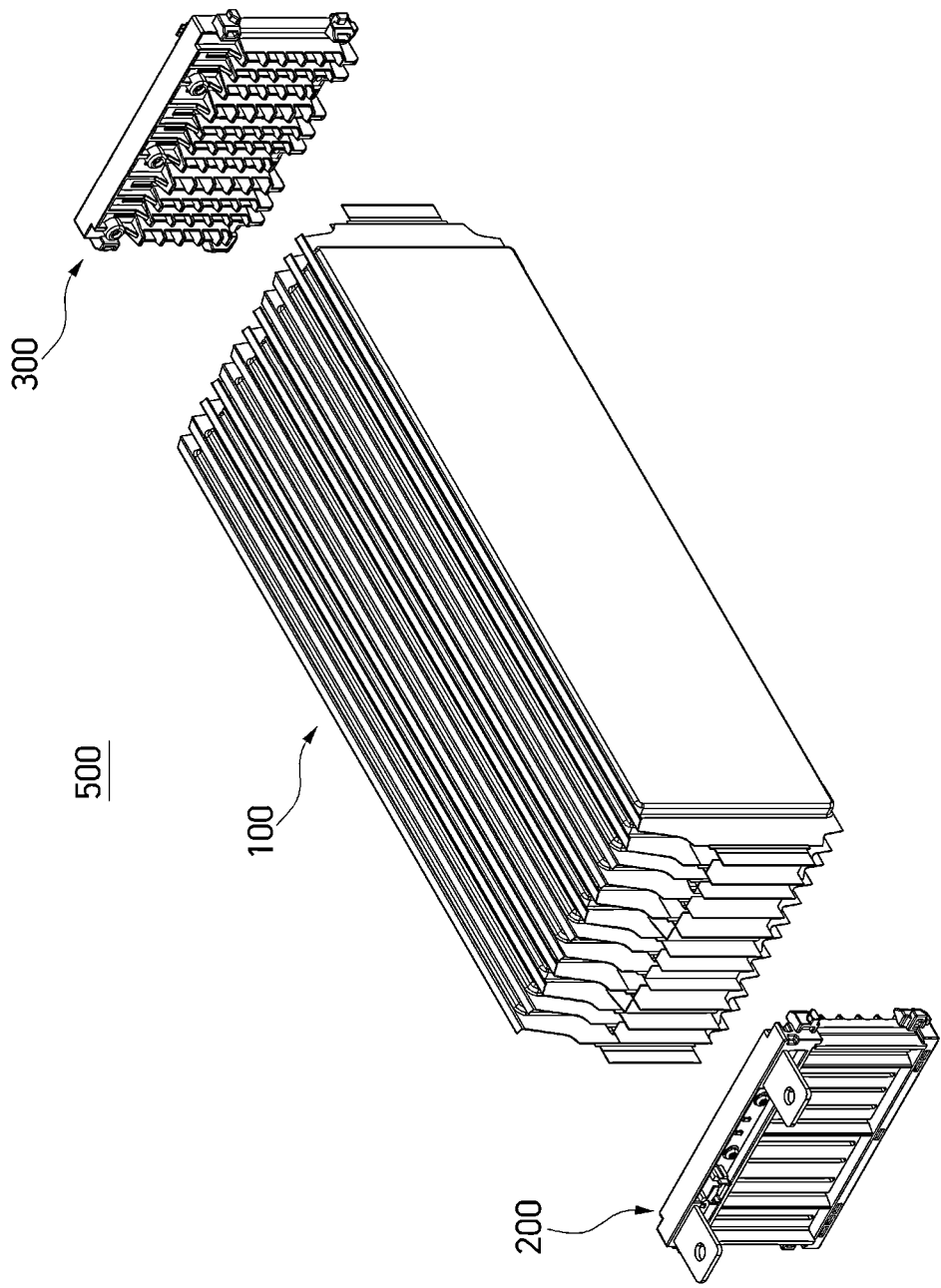
FIG. 3 is an exploded perspective view of a battery module assembly according to an embodiment of the present invention.
Figure 4:
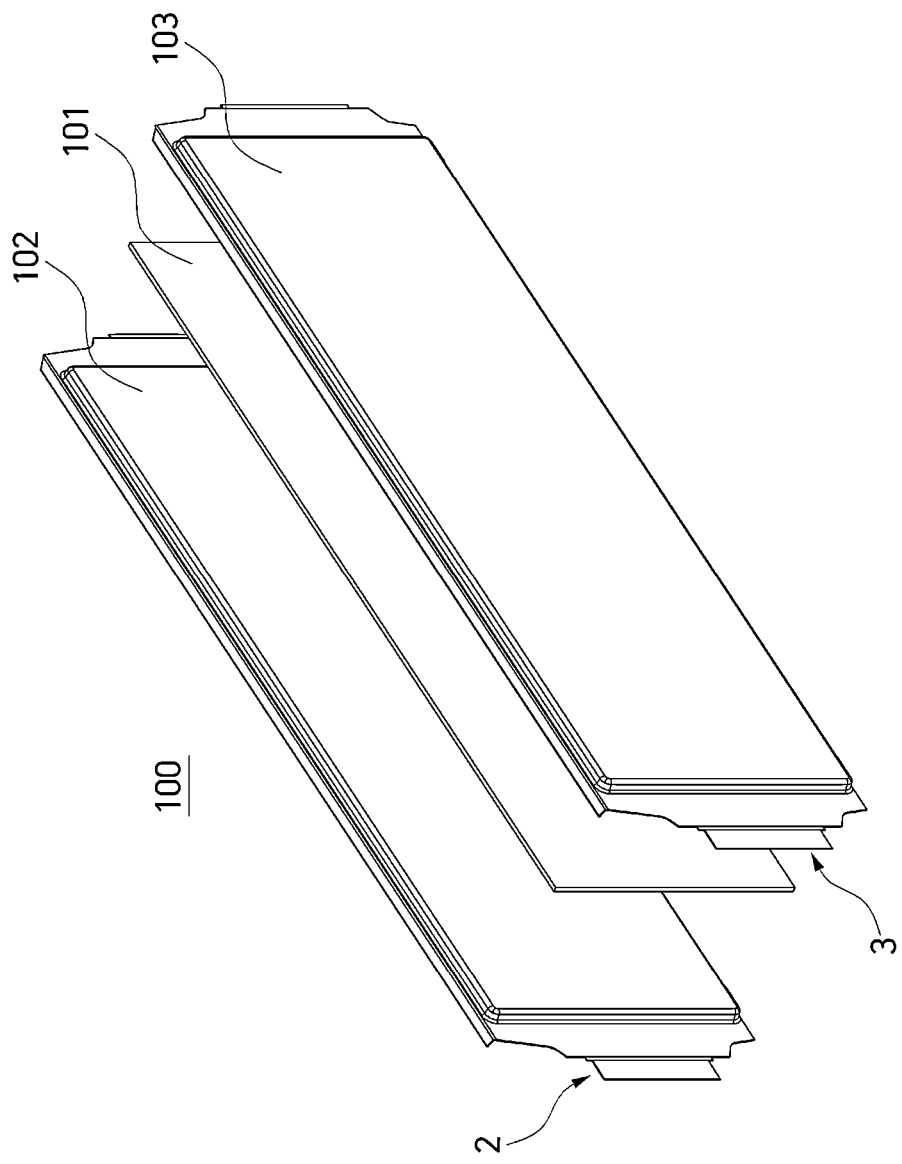
FIG. 4 is a perspective view illustrating a unit structure of a cell assembly illustrated in FIG. 3.

FIG. 3 is an exploded perspective view of a battery module assembly 500 according to an embodiment of the present invention, and FIG. 4 is a perspective view illustrating a unit structure of a cell assembly illustrated in FIG. 3.

Referring to FIG. 3, the battery module assembly 500 according to an embodiment of the present invention may include a cell assembly 100, a front frame 200, and a rear frame 300.

The cell assembly 100 may include a plurality of stacked pouch type of battery cells, and as illustrated in FIG. 4, may further include a pad 112 which is disposed between two adjacent battery cells of the battery cells.

The pad 101 may provide a surface pressure so that a plurality of battery cells 102 and 103 are closely adhered to each other. Each of the battery cells 102 and 103 may include a plurality of electrode lids 2 and 3 unloaded from both ends thereof.

The front frame 200 and the rear frame 300 are respectively installed in front and rear of the cell assembly 100 in the stacking direction.

Also, the electrode lid 2 of the battery cell 102 and the electrode lid 3 of the battery cell 103 may be connected to a bus bar assembly 207 integrated (molded) into the front frame 200 in series/parallel on the basis of an insert injection molding process.

Also, electrode lids (not clearly shown in FIG. 4), which are opposite to the electrode lids 2 and 3, of the battery cells 102 and 103 may be connected to the bus bar integrated into the rear frame 300 in series/parallel on the basis of the insert injection molding process In the battery module assembly 500 according to an embodiment of the present invention, a separate cartridge (30 of FIG. 1) and separate bus bars 42 and 44 configuring the battery module assembly of the related art are not needed. This is because a function of the cartridge (30 of FIG. 1) and a function of the bus bars 42 and 44 are integrated into the front/rear frame 200/300 according to an embodiment of the present invention which will be described below.

As described above, in the battery module assembly according to an embodiment of the present invention, because the cartridge (30 of FIG. 1) and the bus bars 42 and 44 of the related art are integrated into the front/rear frame 200/300, the number of elements, process complexity, weight, and a size may be reduced.

Hereinafter, a front frame and a rear frame will be described in detail.

Figure 5:
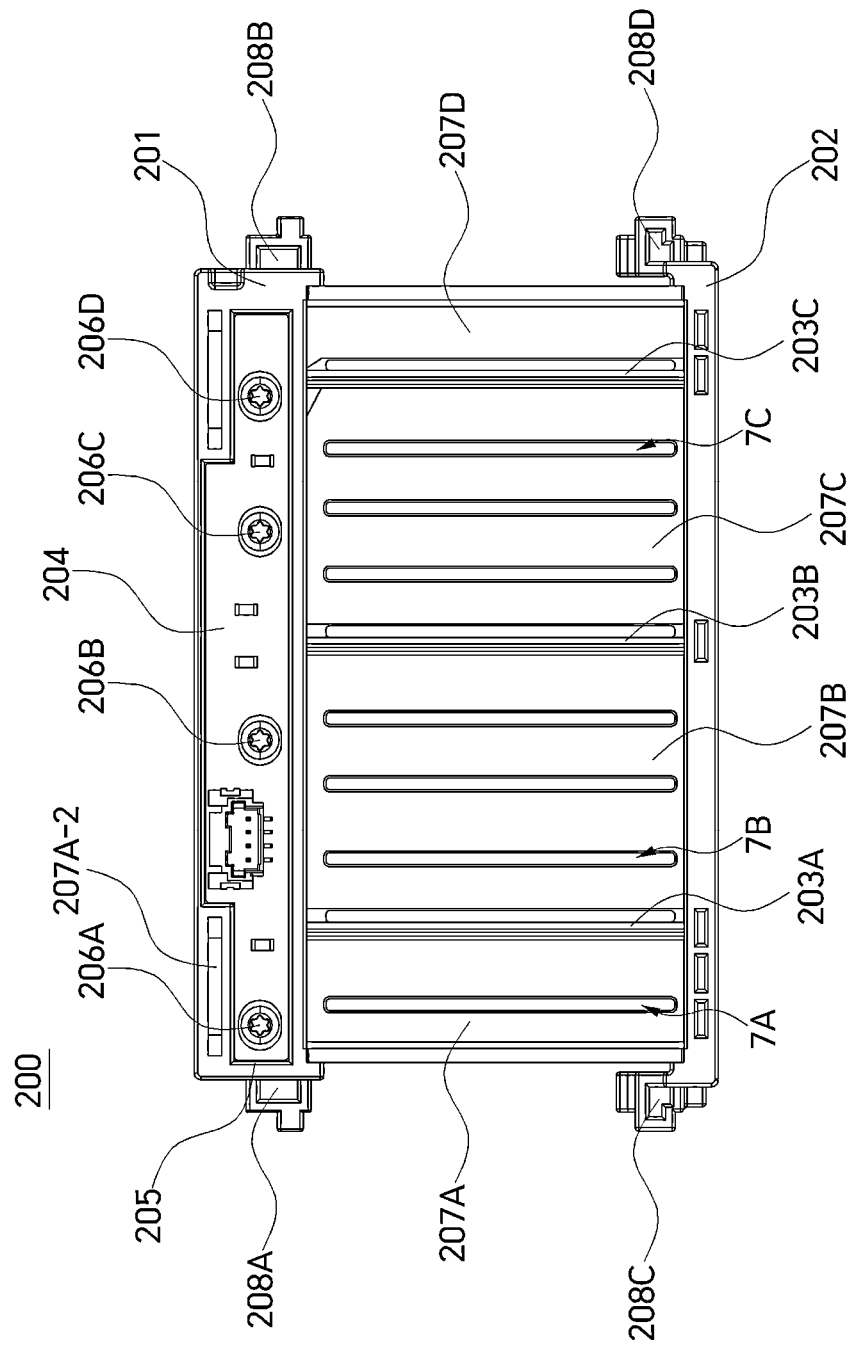
FIG. 5 is a front view as a front frame illustrated in FIG. 3 is seen from a forward region.
Figure 6:
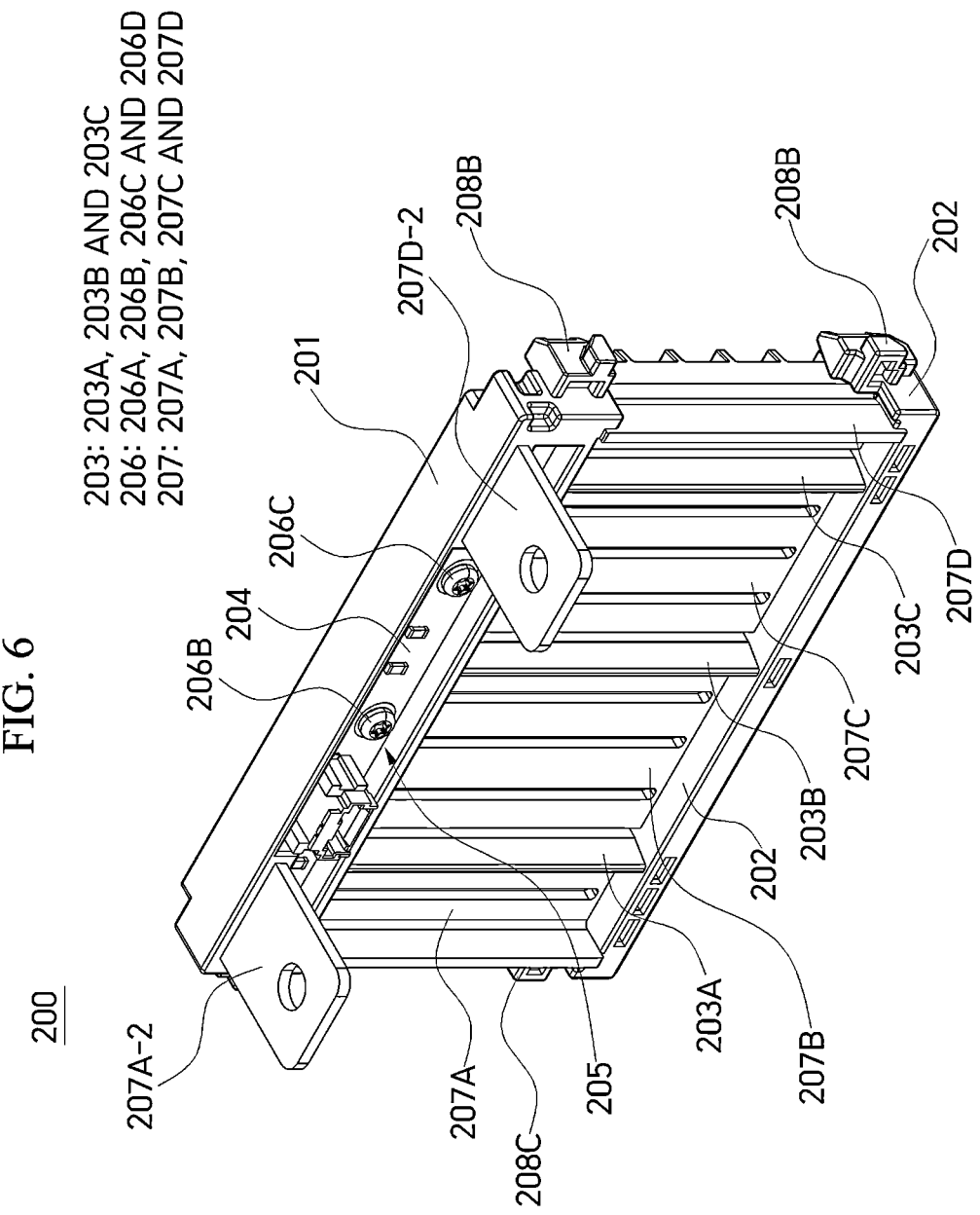
FIG. 6 is a perspective view for three-dimensionally showing a front frame illustrated in FIG. 5.
Figure 7:
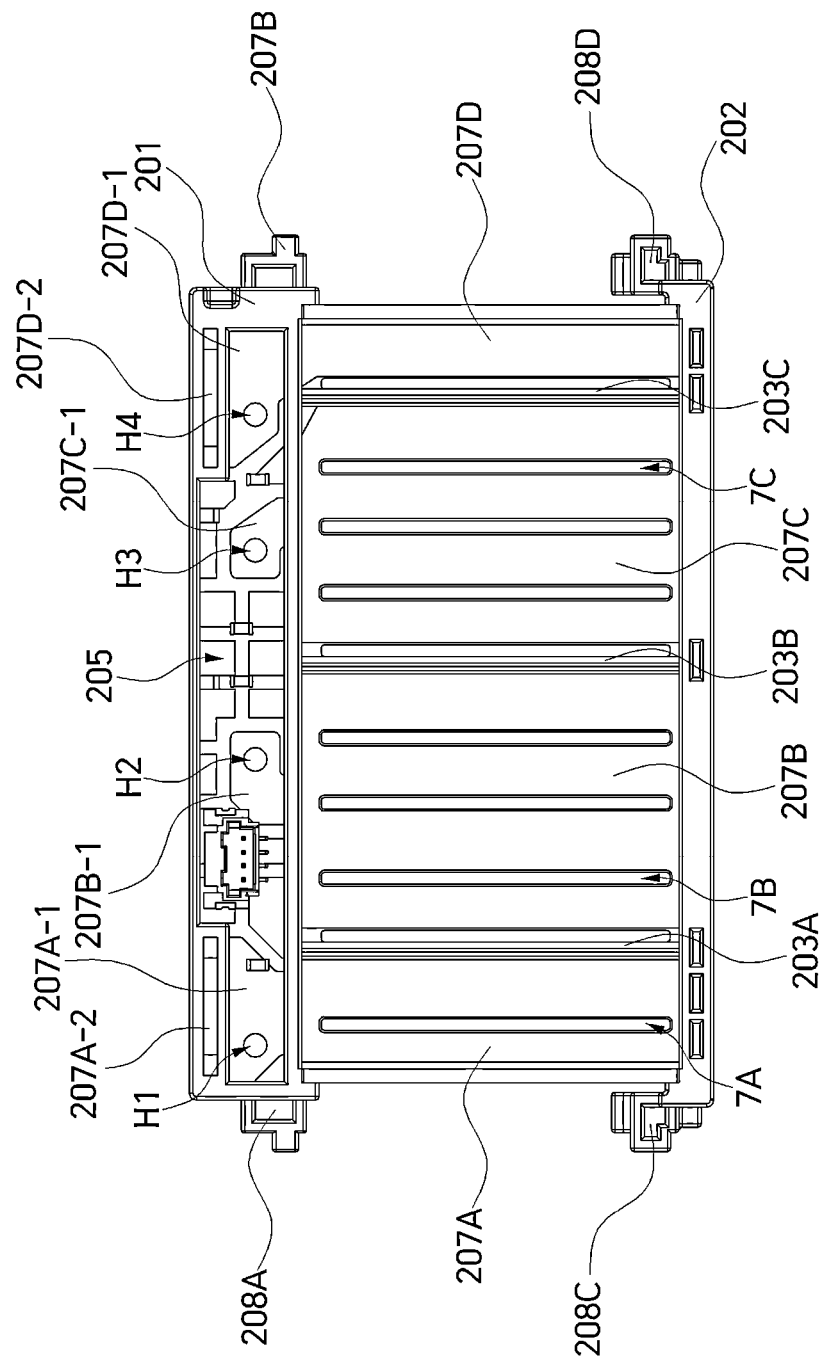
FIG. 7 is a front view of a front frame in a state where a PCB is removed.
Figure 8:
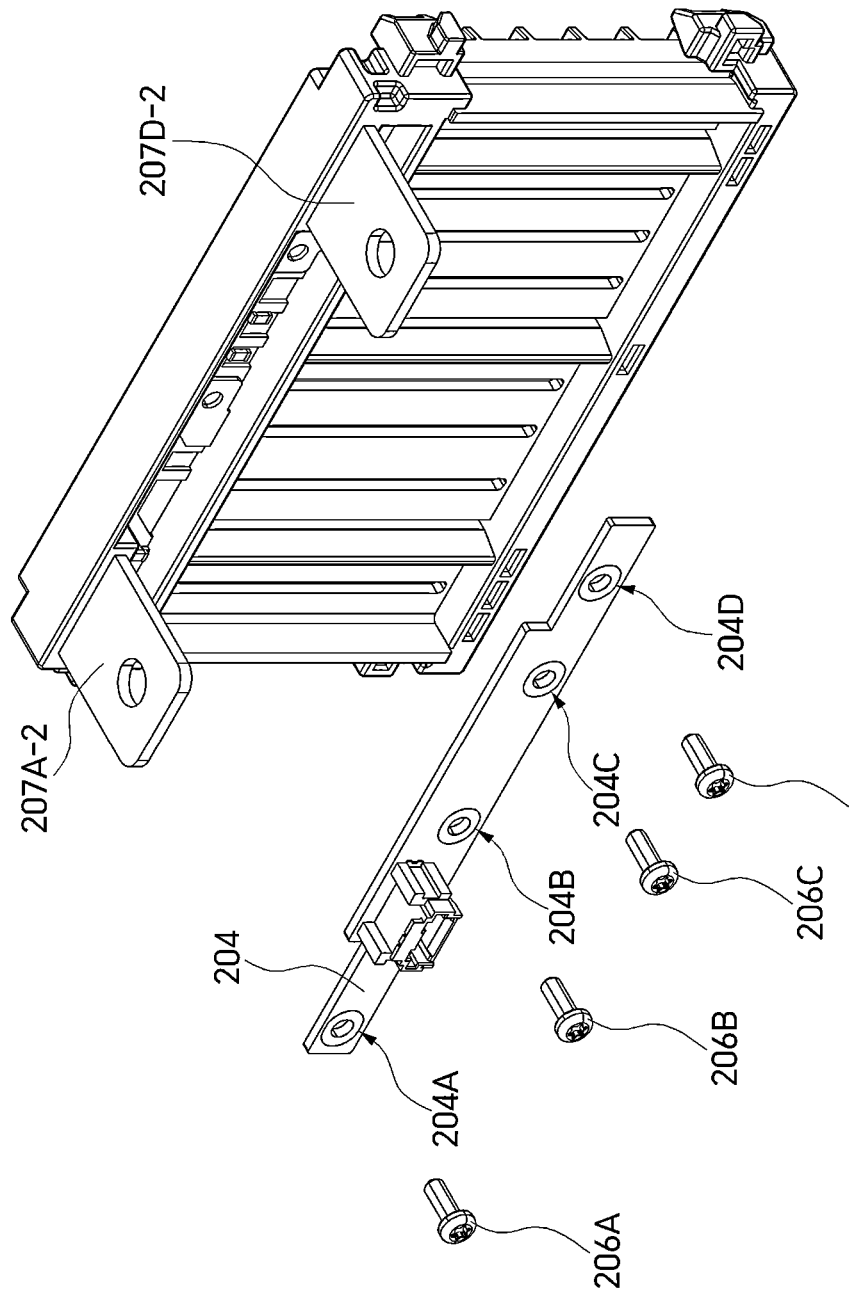
FIG. 8 is a diagram for describing a coupling structure of a PCB and a front frame.
Figure 9:
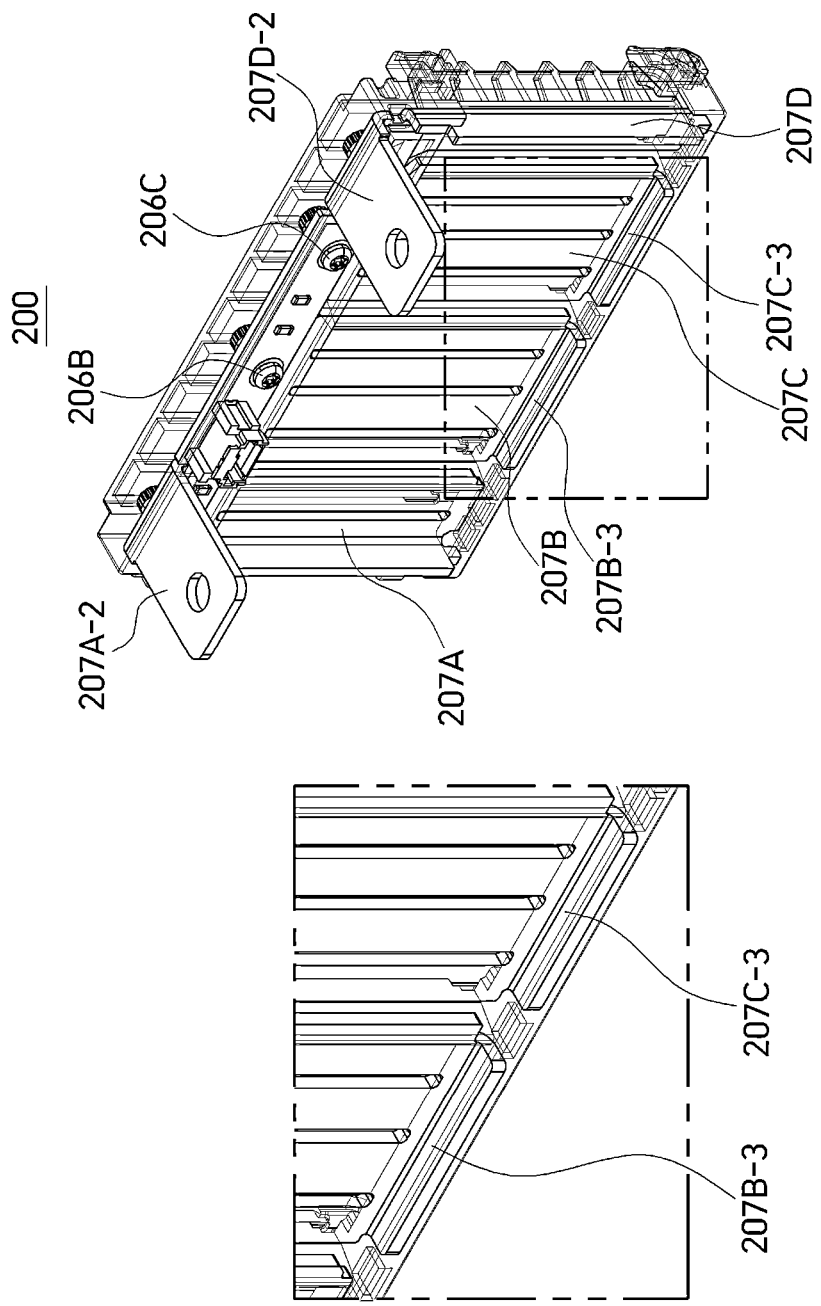
FIG. 9 is a diagram illustrating an example where some structure materials of a front frame illustrated in FIG. 6 have been processed.

FIG. 5 is a front view as a front frame illustrated in FIG. 3 is seen from a forward region. FIG. 6 is a perspective view for three-dimensionally showing a front frame illustrated in FIG. 5. FIG. 7 is a front view of a front frame in a state where a PCB is removed. FIG. 8 is a diagram for describing a coupling structure of a PCB and a front frame. FIG. 9 is a diagram illustrating an example where some structure materials of a front frame illustrated in FIG. 6 have been processed.

Referring to FIGS. 5 to 8, a front frame 200 may have a wholly tetragonal shape.

The front frame 200 may include an upper frame 201, a lower frame 202, a partition wall member 203 connecting the upper frame 201 to the lower frame 202, and a bus bar assembly 207.

The upper frame 201 may include a mounting space 205 which is formed based on a shape of a PCB 204. A plurality of electronic devices for processing voltage information about a battery cell may be mounted on the PCB 204, so as to provide another electronic unit of a vehicle with the voltage information about the battery cell.

The PCB 204 may be coupled to a bolt member 206 and a bus bar assembly 207 integrated (molded) into the front frame 200 on the basis of the insert injection molding process in a state where the PCB 204 is mounted in the mounting space 205.

The bolt member 206, as illustrated in FIG. 8, may be configured with four bolts 206A to 206D for example, and four coupling grooves 204A to 204D respectively coupled to the four bolts 206A to 206D may be provided in the PCB 204. Also, four coupling grooves (H1 to H4 of FIG. 7) may be provided in the bus bar assembly 207 disposed under the PCB 204.

The four bolts 206A to 206D may be coupled to the four coupling grooves 204A to 204D and the four coupling grooves (H1 to H4 of FIG. 7) and may couple the PCB 204 to the bus bar assembly 207.

As described above, the PCB 204 and the bus bar assembly 207 may be coupled to each other by a bolt coupling structure using the bolt member 206, and thus, when a defect occurs in a fuse or an element mounted on the PCB 204, the PCB 204 may be detached from a front frame (or an upper frame) and only a corresponding element of the PCB 204 may be replaced.

Figure 2:
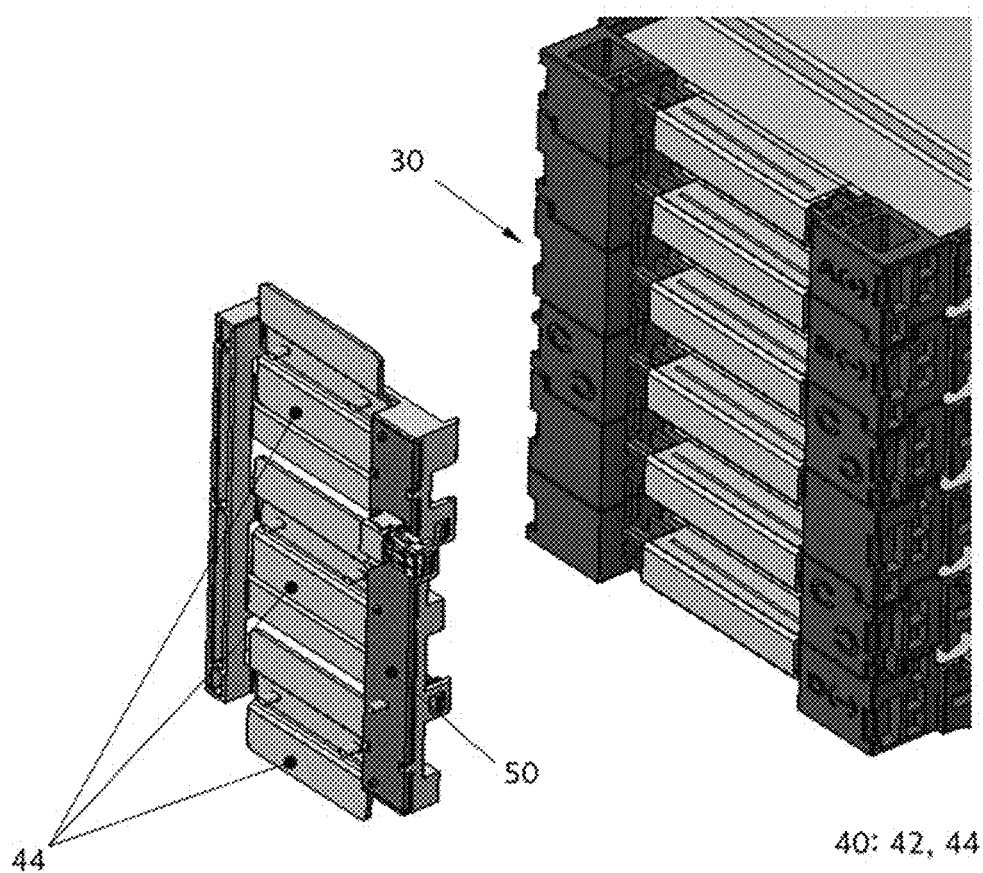

On the other hand, in the related art, as illustrated in FIG. 2, the PCB 50 may be coupled to the bus bar 44 by a soldering process, and thus, when a defect occurs in a corresponding element, a battery module may be discarded.

A stopper member 208 may be provided on both side surfaces of each of the upper frame 201 and the lower frame 202.

The stopper member, for example, may include two stoppers 208A and 208B provided on the both side surfaces of the upper frame 201 and two stoppers 208C and 208D provided on the both side surfaces of the lower frame 202.

The stopper member 208 may fix the front frame 200 to an end plate so that a position of the bus bar assembly 207 is twisted, in coupling a cell assembly (100 of FIG. 3) to the bus bar assembly 207 integrated (molded) into the front frame 200.

The bus bar assembly 207 integrated (molded) into the front frame 200 may connect battery cells configuring the cell assembly 100 in series and parallel.

The bus bar assembly 207 may include four bus bars 207A to 207D which are disposed between the upper frame 201 and the lower frame 202 and are partitioned by the partition wall member 203 connecting the upper frame 201 to the lower frame 202.

A first bus bar 207A may be implemented in a tetragonal plate shape and may include a slit hole 7A through which an electrode lid (2 or 3 of FIG. 4) passes. The slit hole 7A may be formed in a lengthwise direction.

Moreover, the first bus bar 207A may further include a coupling member 207A-1 which extends toward the mounting space 205 of the upper frame 201 from an upper end thereof. A coupling groove H1 coupled to the above-described bolt 206A may be formed in the coupling member 207A-1.

Moreover, the coupling member 207A-1 may further include a terminal member 207A-2 which is bent vertically from an end portion thereof. The terminal member 207A-2 may electrically connect the battery module assembly according to an embodiment of the present invention to another battery module assembly (not shown).

The coupling member 207A-1 and the terminal member 207A-2, as illustrated, may be disposed as a type which is molded in the upper frame 201.

A second bus bar 207B may be implemented in a tetragonal plate shape and may be insulated from the first bus bar 207A by a first partition wall 203A. The second bus bar 207B may include at least one slit hole 7B through which an electrode lid passes. The slit hole 7B may be formed in a lengthwise direction.

Moreover, the second bus bar 207B may further include a coupling member 207B-1 which extends toward the mounting space 205 of the upper frame 201 from an upper end thereof. A coupling groove H2 coupled to the above-described bolt 206B may be formed in the coupling member 207B-1.

A third bus bar 207C may be implemented in a tetragonal plate shape and may be insulated from the second bus bar 207B by a second partition wall 203B. The third bus bar 207C may include at least one slit hole 7C through which an electrode lid passes. The slit hole 7C may be formed in a lengthwise direction.

Moreover, the third bus bar 207C may further include a coupling member 207C-1 which extends toward the mounting space 205 of the upper frame 201 from an upper end thereof. A coupling groove H3 coupled to the above-described bolt 206C may be formed in the coupling member 207C-1.

A fourth bus bar 207D may be implemented in a tetragonal plate shape and may be insulated from the third bus bar 207C by a third partition wall 203C. In FIGS. 5 and 7, it is illustrated that a slit groove is not formed in the fourth bus bar 207D, but a slit groove may also be formed in the fourth bus bar 207D.

The fourth bus bar 207D may further include a coupling member 207D-1 which extends toward the mounting space 205 of the upper frame 201 from an upper end thereof. A coupling groove H4 coupled to the above-described bolt 206D may be formed in the coupling member 207D-1.

The coupling member 207D-1 may further include a terminal member 207D-2 which is bent vertically from an end portion thereof with respect to the coupling member 207A-1. The terminal member 207D-2 may electrically connect the battery module assembly according to an embodiment of the present invention to another battery module assembly (not shown).

Moreover, as illustrated in FIG. 9, unlike the first and fourth bus bars 207A and 207D, the second and third bus bars 207B and 207C may further include extension portions 207B-3 and 207C-3 which are bent vertically from a lower end thereof, respectively.

The extension portions 207B-3 and 207C-3 may be disposed as a type which is integrated (molded) into the lower frame 202.

The extension portions 207B-3 and 207C-3 may increase a square SQ of the second and third bus bars 207B and 207C. Resistance values of the extension portions 207B-3 and 207C-3 may be reduced by the extension portions 207B-3 and 207C-3.

The first and fourth bus bars 207A and 207D may respectively include the terminal members 207A-2 and 207D-2 which extend vertically with respect to the coupling members 207A-1 and 207D-1, and thus, may form a sufficient square. Accordingly, the first and fourth bus bars 207A and 207D may not need a structure material such as the extension portions 207B-3 and 207C-3 included in the second and third bus bars 207B and 207C.

Figure 10:
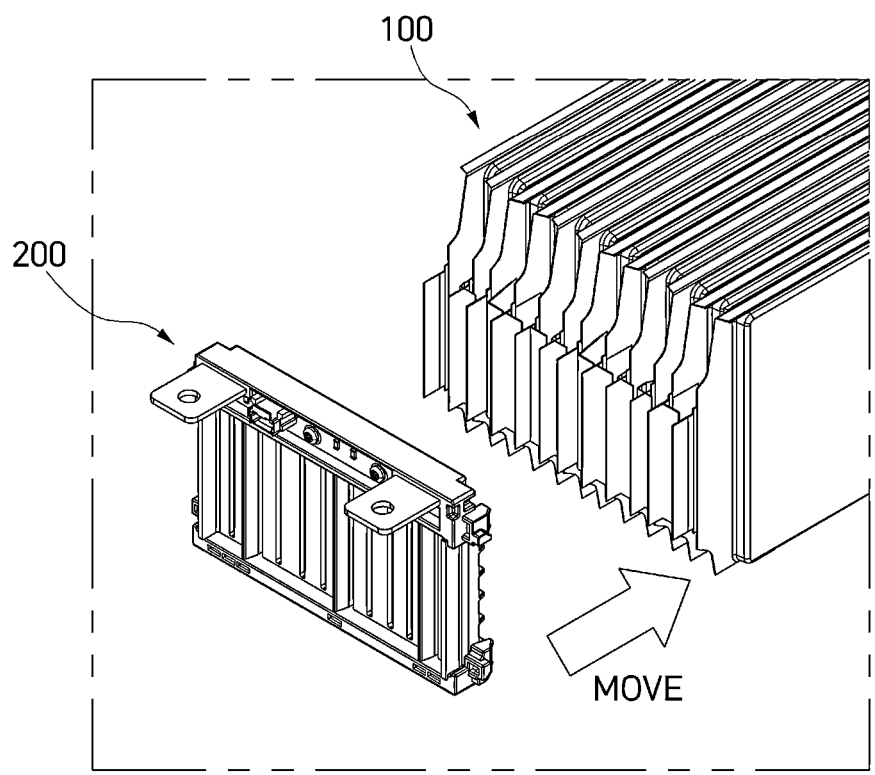
FIGS. 10 to 12 are diagrams for describing an electrode connection structure of a bus assembly integrated (molded) into the front frame illustrated in FIG. 6 and a cell assembly illustrated in FIG. 3.
Figure 11:
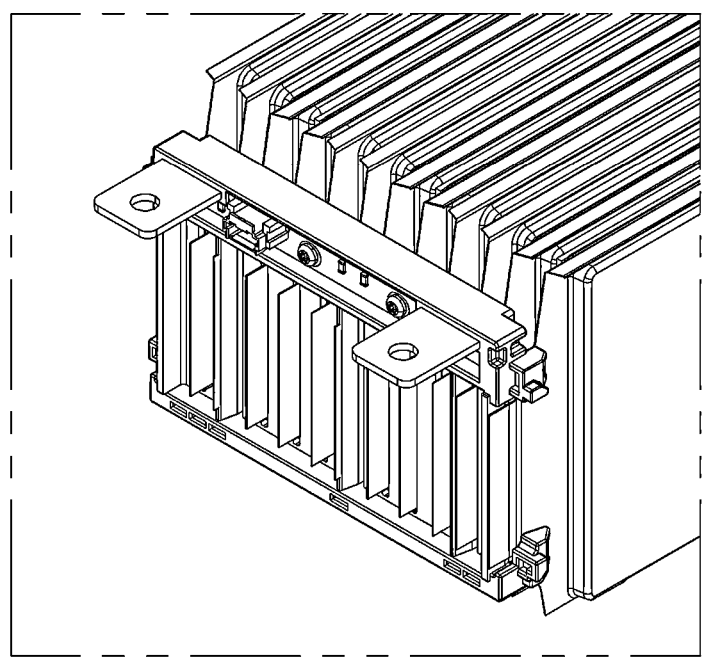
Figure 12:
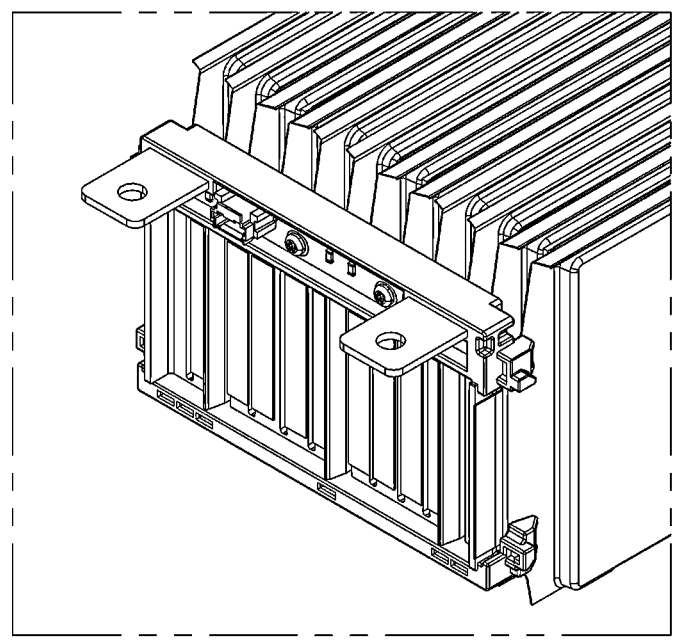

FIGS. 10 to 12 are diagrams for describing an electrode connection structure of a bus assembly integrated (molded) into the front frame illustrated in FIG. 6 and a cell assembly illustrated in FIG. 3.

As illustrated in FIG. 10, when manufacturing of a front frame 200 is completed, the front frame 200 may move toward an electrode lid of a cell assembly 100.

Subsequently, as illustrated in FIG. 11, electrode lids respectively unloaded from battery cells configuring the cell assembly 100 may be inserted into slit holes 7A to 7C of bus bar assemblies 207 (207A to 207D).

Subsequently, as illustrated in FIG. 12, the electrode lids inserted into the slit holes 7A to 7C may be bent, and the bent electrode lids may be adhered and welded to the bus bar assemblies 207 (207A to 207D).

Therefore, the battery cells configuring the cell assembly 100 may be connected to one another in series and parallel by using the bus bar assemblies 207 (207A to 207D) integrated (molded) into the front frame 200.

A rear surface of the front frame 200 may be molded in an inclined structure so that the electrode lids respectively unloaded from the battery cells are easily inserted into the slit holes 7A to 7C.

Figure 13:
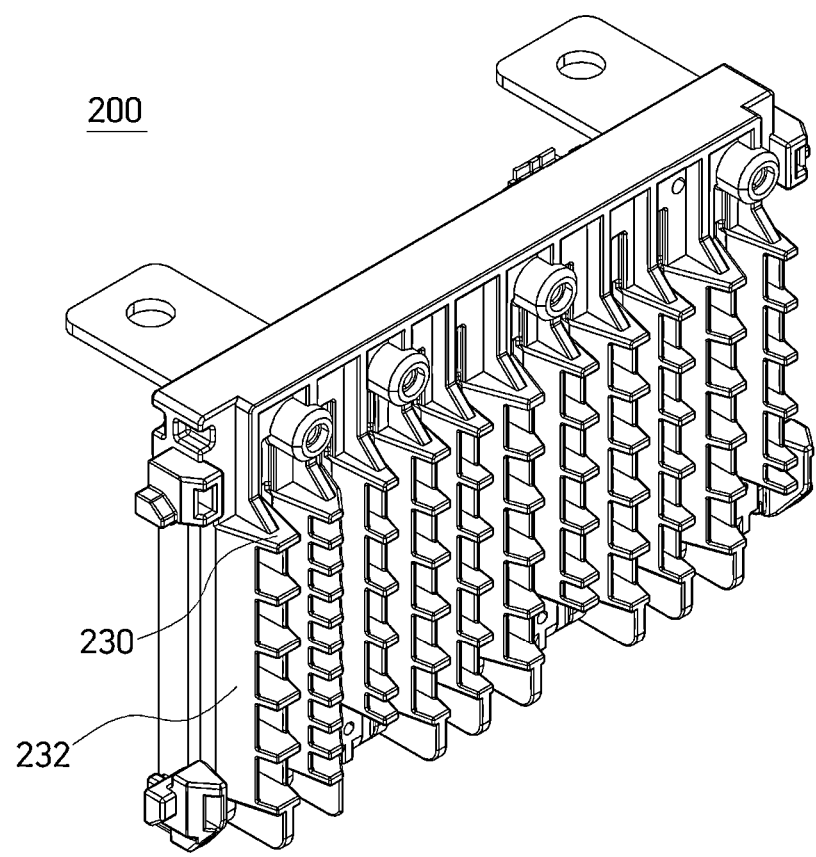
FIG. 13 is a perspective view for showing a rear structure of a front frame according to an embodiment of the present invention.
Figure 14:
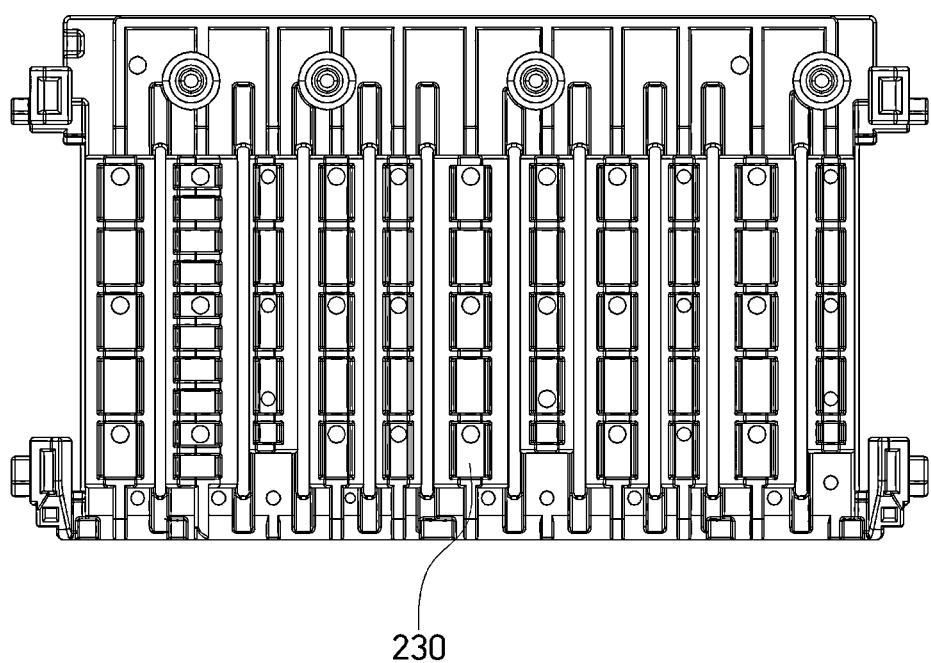
FIG. 14 is a diagram as a rear surface of the front frame of FIG. 3 is seen from a forward region.
Figure 15:
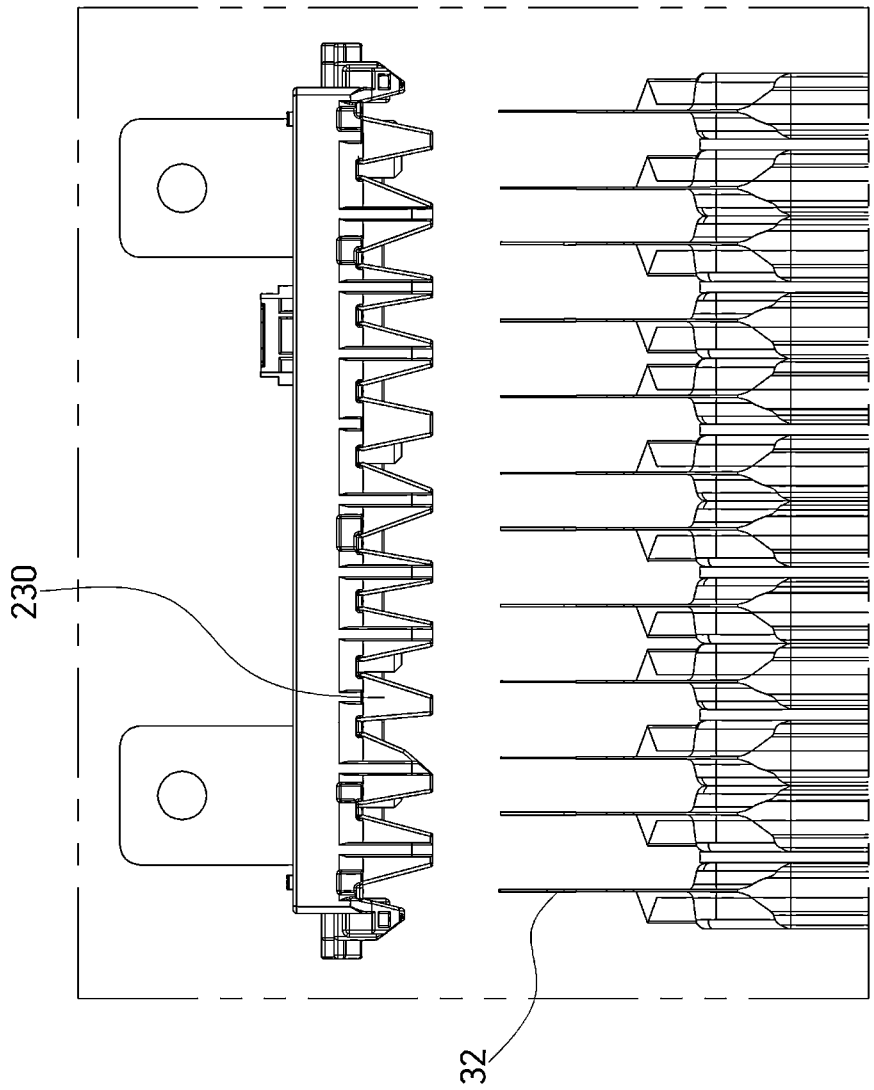
FIG. 15 is a diagram as the front frame of FIG. 13 is seen from above.
Figure 16:
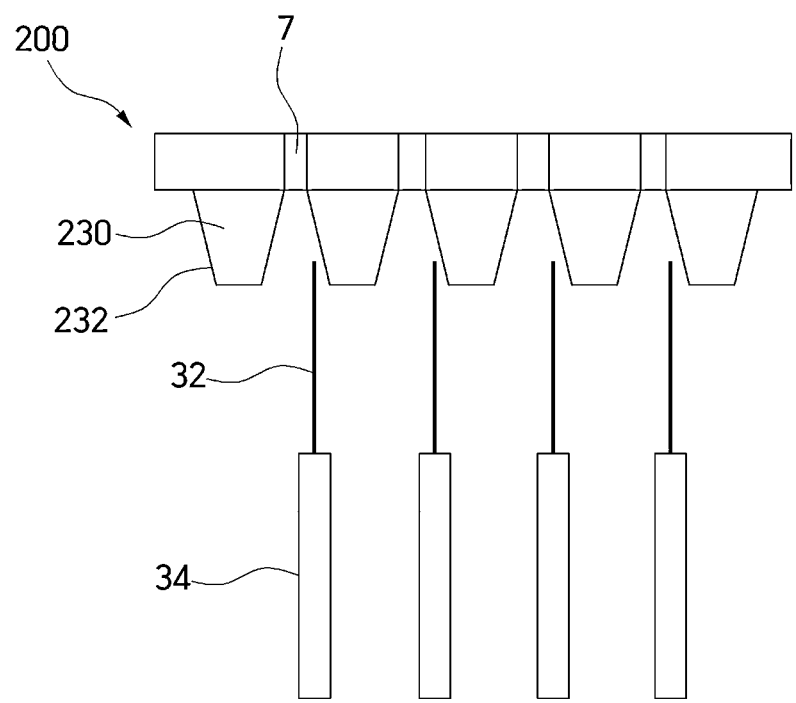
FIGS. 16 and 17 are diagrams schematically illustrating an inclined structure molded in a rear surface of a rear frame.
Figure 17:
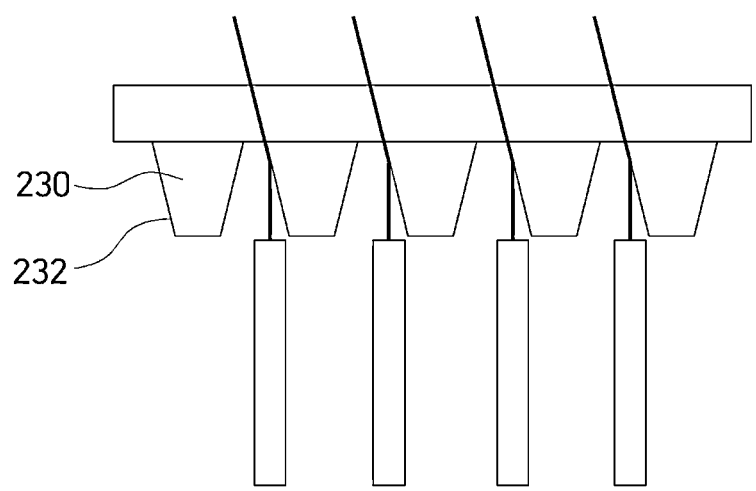

FIG. 13 is a perspective view for showing a rear structure of a front frame according to an embodiment of the present invention. FIG. 14 is a diagram as a rear surface of the front frame of FIG. 3 is seen from a forward region. FIG. 15 is a diagram as the front frame of FIG. 13 is seen from above. FIGS. 16 and 17 are diagrams schematically illustrating an inclined structure molded in a rear surface of a frame.

Referring to FIGS. 13 to 15, a guide member 230 for enabling electrode lids respectively unloaded from battery cells to be easily inserted into slit holes 7A to 7C may be provided on a rear surface of a front frame 200.

The guide member 230 may extend in a lengthwise direction with a slit groove, formed in the bus bar assembly 207, therebetween. An inclined surface 232 inclined in an insertion direction of an electrode lid may be provided on both side surfaces of the guide member 230.

As illustrated in FIG. 16, a state where an electrode lid 32 of a battery cell 34 extends rectilinearly may be maintained before the battery cell 34 is inserted into a slit hole 7.

Subsequently, as illustrated in FIG. 17, the electrode lid 32 of the battery cell 34 may be naturally inserted into the slit hole 7 along the inclined surface 232. The guide member 230 for enabling the electrode lids respectively unloaded from the battery cells to be easily inserted into the slit holes 7A to 7C may be provided on the rear surface of the front frame 200, and thus, the damage of a cell assembly (the damage of an electrode) may be prevented from occurring in coupling the cell assembly to a bus bar assembly.

Figure 18:
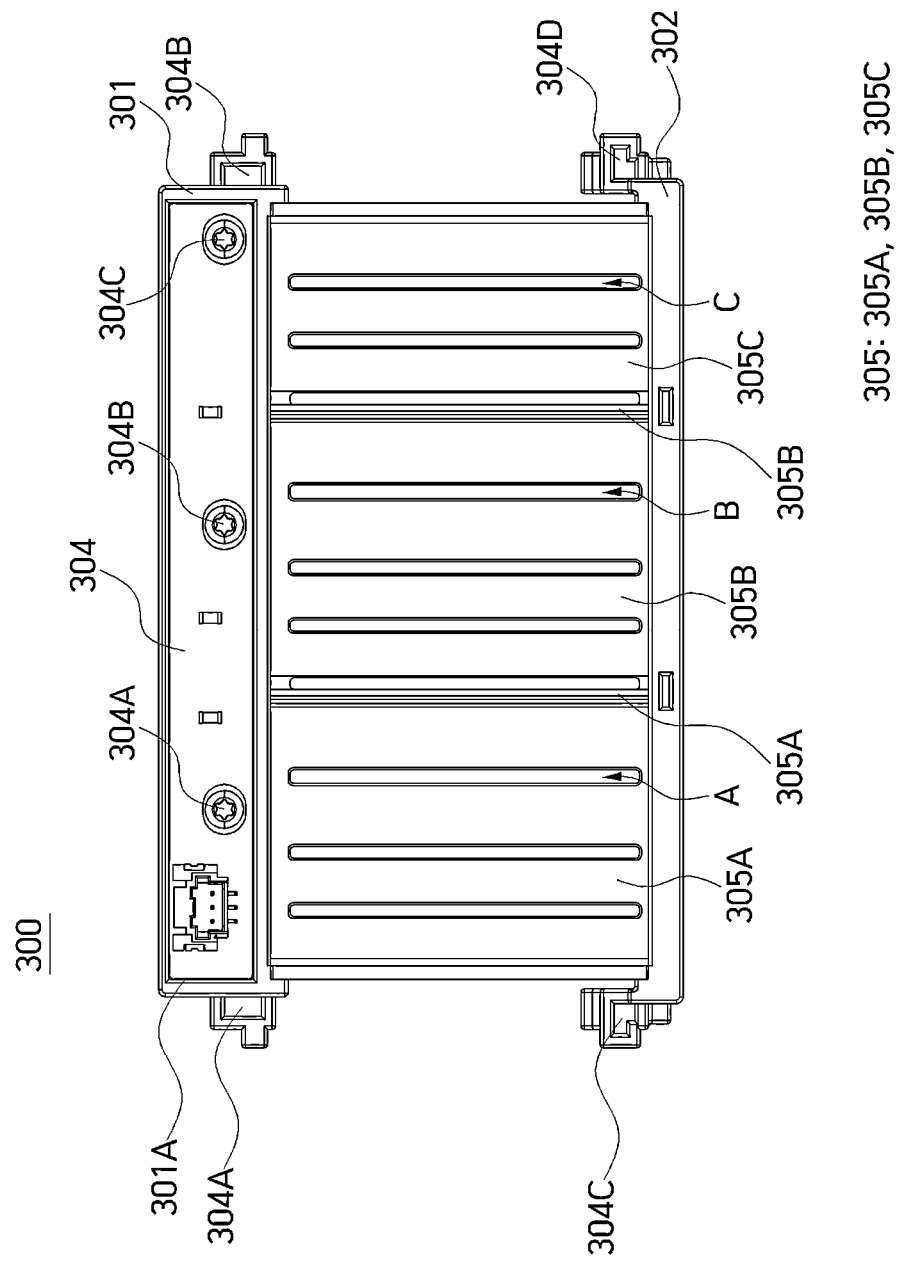
FIG. 18 is a front view as the rear frame illustrated in FIG. 3 is seen from the front.

FIG. 18 is a front view as the rear frame illustrated in FIG. 3 is seen from the front.

Referring to FIG. 18, a rear frame 300 may include an upper frame 301, a lower frame 302, and a plurality of partition wall members 303A and 303B connecting the upper frame 301 to the lower frame 302.

Moreover, the rear frame 300 may further include a PCB 304 mounted in a mounting space 301A formed in the upper frame 301. The PCB 304 may be an element which transfers voltage information about a battery cell to an external unit of a vehicle, and to this end, a plurality of electronic devices for processing the voltage information may be mounted on the PCB 304.

The PCB 204 may be coupled to bus bar assemblies 305A to 305C by using bolt members 304A to 304C in a state where the PCB 304 is mounted in the mounting space 301A.

A plurality of stopper members 304A to 304D may be provided on both side surfaces of each of the upper frame 301 and the lower frame 302. The stopper members 304A to 304D, like the above description of the front frame 200, may fix the rear frame 300 to an end plate so that a position of the bus bar assembly 305 is not twisted, in coupling a cell assembly (100 of FIG. 3) to the bus bar assembly 305 integrated (molded) into the rear frame 300.

Moreover, the rear frame 300 may further include a bus bar assembly 305 which connects in series and parallel electrode lids (2 or 3 of FIG. 4) respectively unloaded from a plurality of battery cells included in a cell assembly (100 of FIG. 3). In this case, the bus bar assembly 305 may be provided as a type which is integrated (molded) into the rear frame 300 on the basis of the insert injection molding process.

The bus bar assembly 305 may include first to third bus bars 305A to 305C having a tetragonal plate shape.

Each of the first to third bus bars 305A to 305C may be implemented in a tetragonal plate shape and may include at least one slit hole A, B, or C formed in a lengthwise direction.

The slit hole A, B, or C may be formed in a lengthwise direction.

The electrode lid unloaded from each of the battery cells may be inserted into the slit hole A, B, or C, the electrode lids inserted into the slit holes A, B, and C may be bent, and the bent electrode lids may be respectively adhered and welded to the first to third bus bars 305A to 305C.

Moreover, although not shown, a guide structure including the same inclined surface as a rear structure of the front frame 200 may be provided in the rear frame 300, and thus, the rear frame 300 may be naturally inserted into each of the slit holes A, B, and C along the inclined surface in a process of inserting the electrode lids into the slit holes A, B, and C.

As described above, a configuration and a shape of the rear frame 300 may be similar to a configuration and a shape of the front frame 200 described above with reference to FIGS. 5 to 17. Therefore, a detailed description of the rear frame 300 may be applied to a description of the front frame 200. However, the bus bars 305A to 305C integrated into the rear frame 300 may have a difference in that the bus bars 305A to 305C do not include the terminal members 207A-2 and 207D-2 provided in the bus bars 207A and 207D integrated into the front frame 200.

Because the bus bars 305A to 305C integrated into the rear frame 300 do not include a terminal member, all of the bus bars 305A to 305C may be configured to include the extension portions 207B-3 and 207-C illustrated in FIG. 9, so as to decrease a resistance value of a bus bar (to increase a square SQ).

That is, in the front frame 200, the bus bars 207B and 207C disposed at a middle portion may be implemented to include an extension portion which extends vertically from a lower end portion thereof, but in the rear frame 300, all of the bus bars 305A to 305C may be implemented to include an extension portion which extends vertically from a lower end portion thereof.

Figure 19:
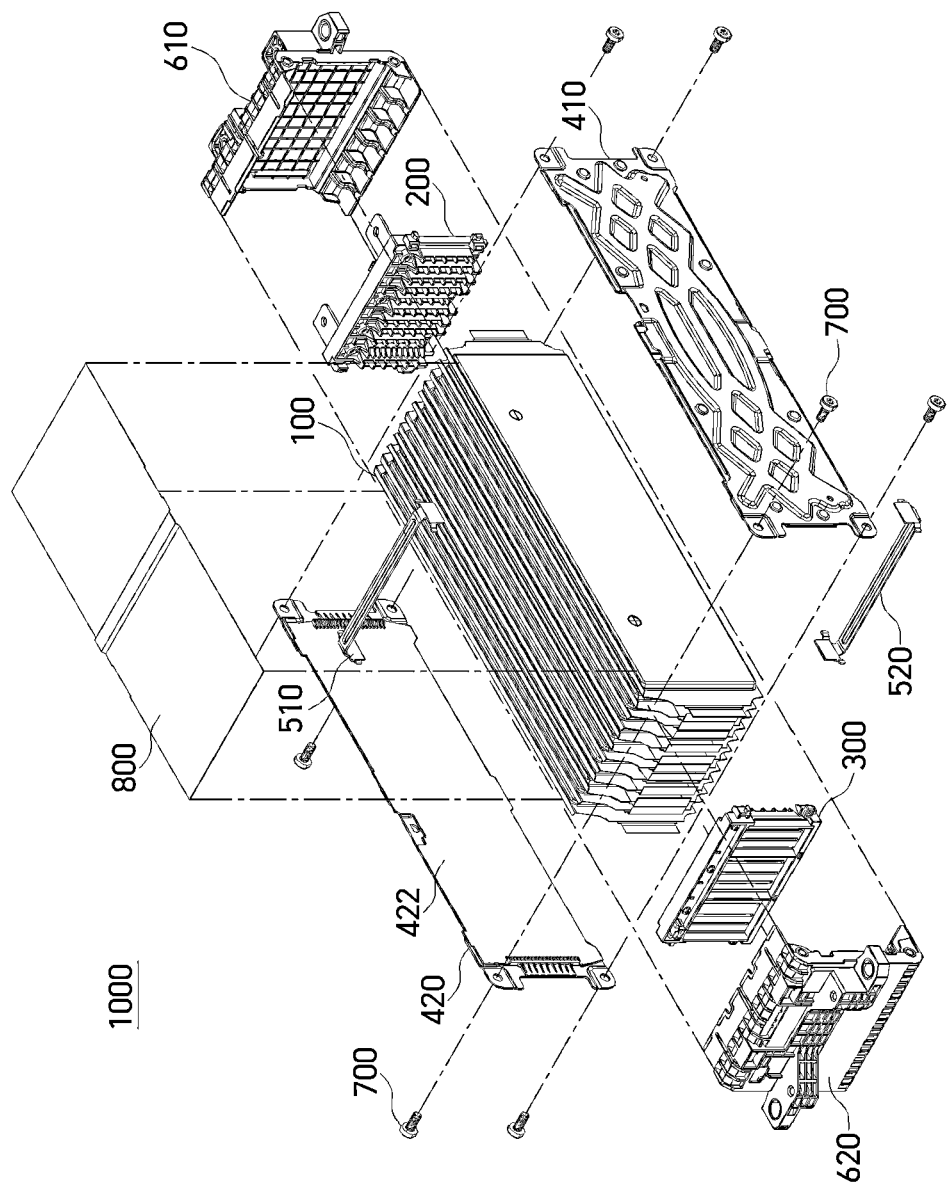
FIG. 19 is an exploded perspective view of a final battery module assembly illustrated along with outer elements of the battery module assembly illustrated in FIG. 3, for describing a final battery module assembly according to another embodiment of the present invention.
Figure 20:
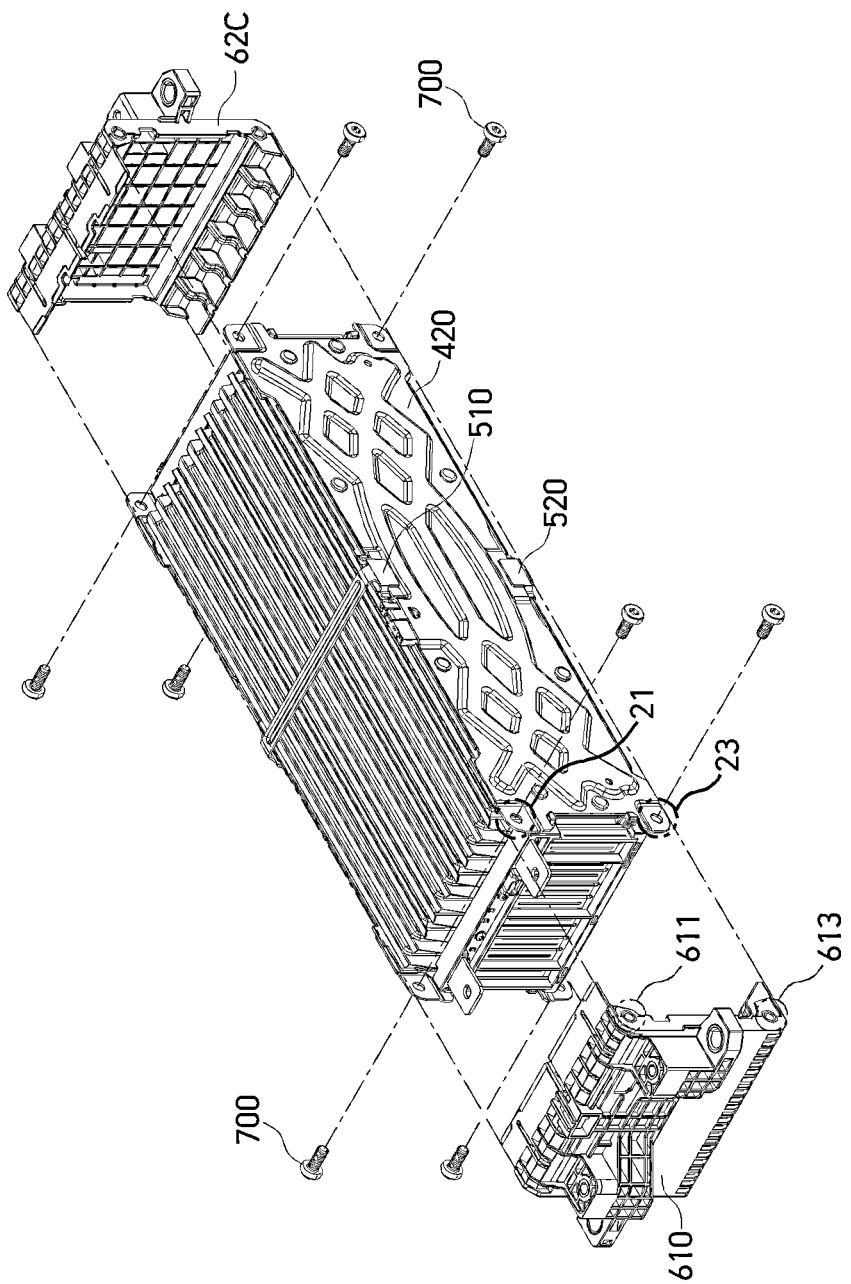
FIG. 20 is a diagram for describing an assembling process performed on two upper/lower clamp members and a front/rear cover illustrated in FIG. 19 in the battery module assembly of FIG. 3.
Figure 21:
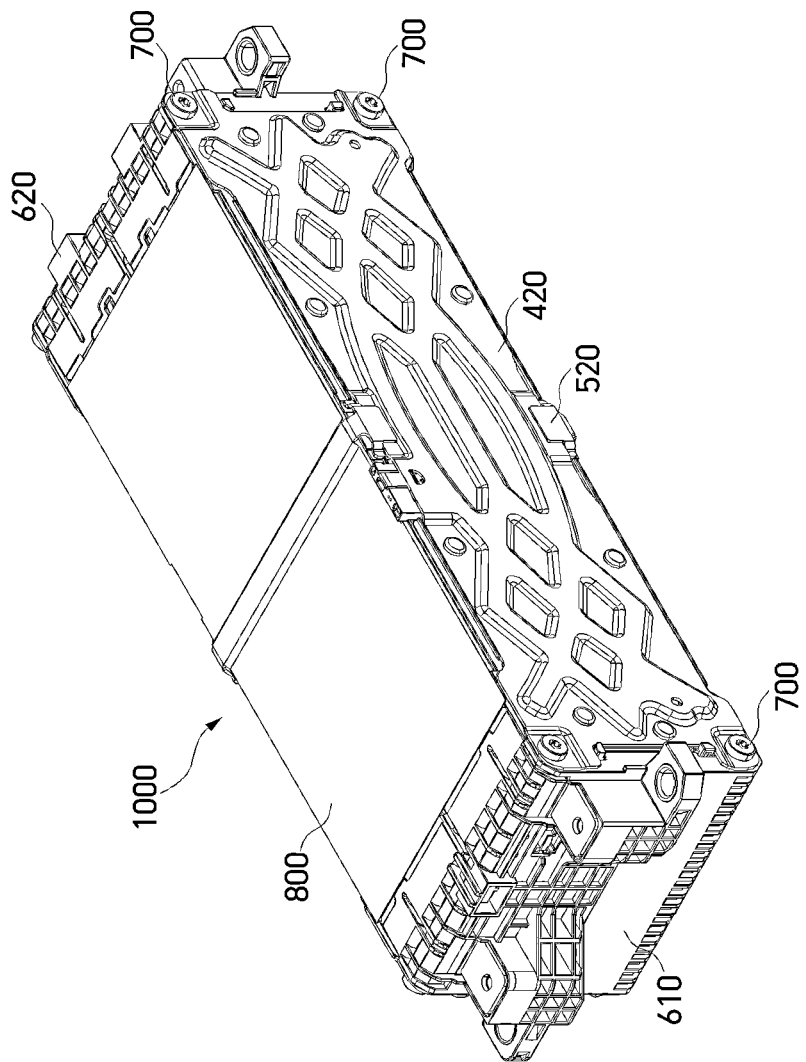
FIG. 21 is a perspective view of a final battery module assembly showing a state where assembly between the battery module assembly illustrated in FIG. 3 and outer elements illustrated in FIG. 19 is completed.

FIG. 19 is an exploded perspective view of a final battery module assembly illustrated along with outer elements of the battery module assembly illustrated in FIG. 3, for describing a final battery module assembly according to another embodiment of the present invention. FIG. 20 is a diagram for describing an assembling process performed on two upper/lower clamp members and a front/rear cover illustrated in FIG. 19 in the battery module assembly of FIG. 3. FIG. 21 is a perspective view of a final battery module assembly showing a state where assembly between the battery module assembly illustrated in FIG. 3 and outer elements illustrated in FIG. 19 is completed.

First, referring to FIG. 19, the final battery module assembly according to another embodiment of the present invention may be configured to further include external elements which cover an outer portion of the battery module assembly illustrated in FIG. 3.

The outer elements covering the outer portion of the battery module assembly illustrated in FIG. 3 may include two end plates 410 and 420, upper and lower clamp members 510 and 520, front and rear covers 610 and 620, a coupling member 700, and an upper cover 800.

Two left and right end plates 410 and 420 may cover left and right side surfaces of the battery module assembly of FIG. 3.

The upper and lower clamp members 510 and 520, as illustrated in FIG. 20, may clamp the battery module assembly of FIG. 3 in a state where the two end plates 410 and 420 covers the left and right side surfaces of the battery module assembly of FIG. 3.

The front and rear covers 610 and 620, as illustrated in FIG. 20, may respectively cover the front frame 200 and the rear frame 300 in a state where the front frame 200 and the rear frame 300 are assembled with a front surface and a rear surface of the cell assembly 100.

The coupling member 700 (a bolt), as illustrated in FIG. 20, may simultaneously pass through a plurality of coupling holes 611 and 613 formed in left and right side surfaces of each of the covers 610 and 620 and a plurality of coupling holes 21 and 23 formed in four corner portions of each of the end plates 410 and 420 and may couple the front and rear covers 610 and 620 to the left and right end plates 410 and 420 on the basis of a bolt coupling process, in a state where the front and rear covers 610 and 620 cover the front and rear frames 200 and 300.

The upper cover 800 may cover an upper portion of the battery module assembly of FIG. 3 and an upper portion of the upper clamp member 510 in a state where the upper portion of the battery module assembly of FIG. 3 is clamped and the front and rear covers 610 and 620 are coupled to the left and right end plates 410 and 420 by the coupling member 700.

As described above, when assembly between the battery module assembly of FIG. 3 and the outer elements covering the outer portion of the battery module assembly of FIG. 3 is completed, a final battery module assembly 1000 illustrated in FIG. 21 may be finished.

Figure 22:
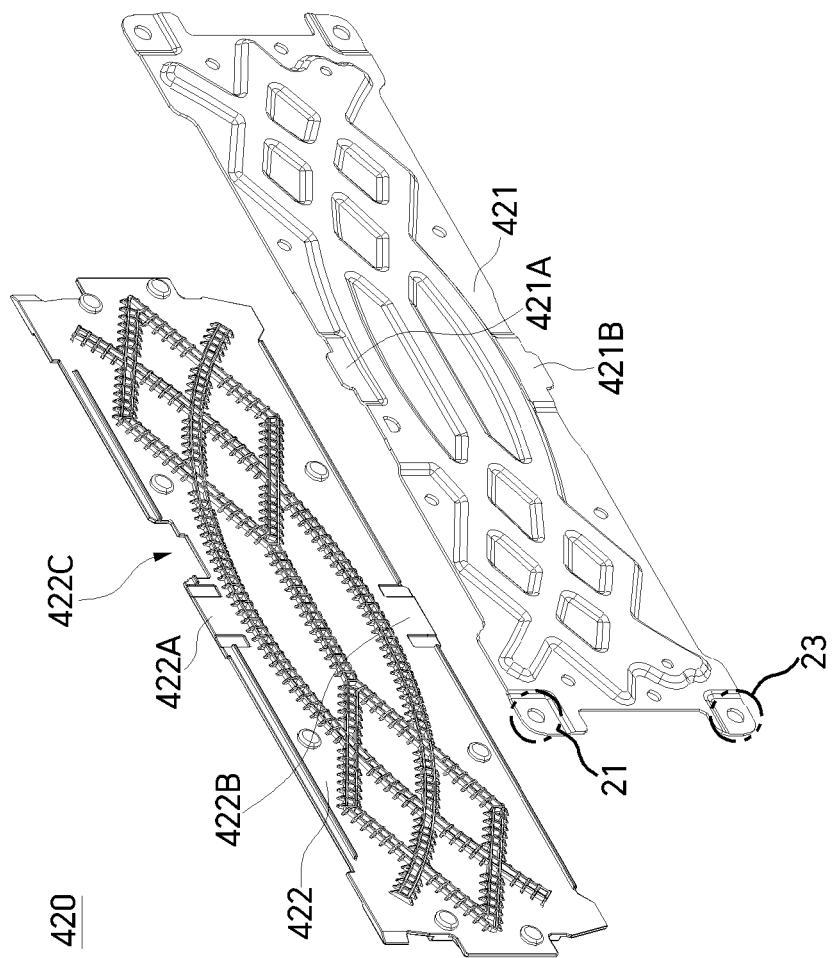
FIG. 22 is a diagram illustrating an internal configuration of an end plate illustrated in FIGS. 19 to 21.

FIG. 22 is a diagram illustrating an internal configuration of an end plate illustrated in FIGS. 19 to 21.

The two left and right end plates 410 and 420 covering the left and right side surfaces of the battery module assembly of FIG. 3 may have the same structure. For convenience of description, a description of the end plate 420 may be applied to a description of the end plate 410.

The end plate 420, as illustrated in FIG. 22, may include an outer panel 421 and an inner panel 422.

The outer panel 421 may have a rectangular shape similar to that of the cell assembly 100. The outer panel 421 (a stiff element) may include a stiff material (for example, a metal material), for securing (preventing cell swelling) the stiffness and surface pressure of the cell assembly 100.

The inner panel 422 may have a rectangular shape similar to that of the outer panel 421 and may include an insulating material (for example, a plastic material), for insulating the cell assembly 100 from the outer panel 421.

An upper bonding portion 421A bonded to one of both ends of the upper clamp 510 may be provided at an upper center portion of the outer panel 421. A lower bonding portion 421B bonded to one of both ends of the lower clamp 520 may be provided at a lower center portion of the outer panel 421.

One end of the upper/lower clamp 510/520 may be bonded to the upper/lower bonding portion 421A/421B by using, for example, a laser welding process.

A region 422A corresponding to the upper bonding portion 421A of the outer panel 421 may be defined at an upper center portion of the inner panel 422. A region 422B corresponding to the lower bonding portion 421B of the outer panel 421 may be defined at a lower center portion of the inner panel 422.

The regions 422A and 422B defined at the upper and lower center portions of the inner panel 422 may prevent a laser from being transferred to the cell assembly 100 in laser welding.

That is, even in a case where a laser passes through the upper and lower bonding portions 421A and 421B of the outer panel 421, the regions 422A and 422B of the inner panel 422 may prevent a portion of the cell assembly 100 from being damaged by the laser transferred to an upper/lower center portion of the cell assembly 100.

Moreover, in a case where a laser passes through the upper and lower bonding portions 421A and 421B of the outer panel 421, thermal deformation or a melting phenomenon may occur in the regions 422A and 422B of the inner panel 422.

In order to prevent the thermal deformation and melting of the regions 422A and 422B, a certain separation distance (a separation space) may be in the upper and lower bonding portions 421A and 421B of the outer panel 421 and in the regions 422A and 422B of the inner panel 422.

The end plate 420 may be injection-molded in a form where the outer panel 421 is coupled to the inner panel 422, in the insert injection molding process, and the separation distance may be formed in the insert injection molding process.

Figure 23A:
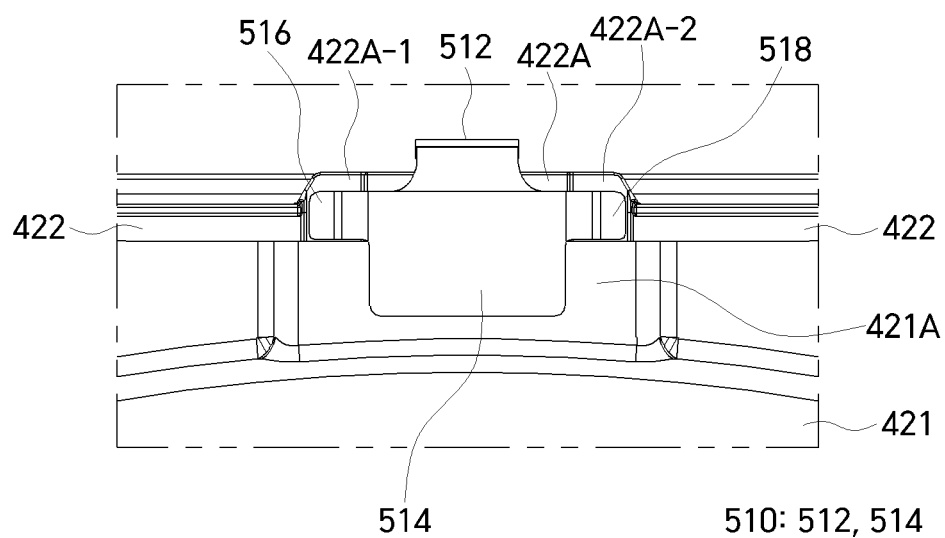
FIGS. 23A-23B are enlarged views of an example where one of both end portions of a clamp is bonded to one of upper/lower center portions of an end plate.
Figure 23B:
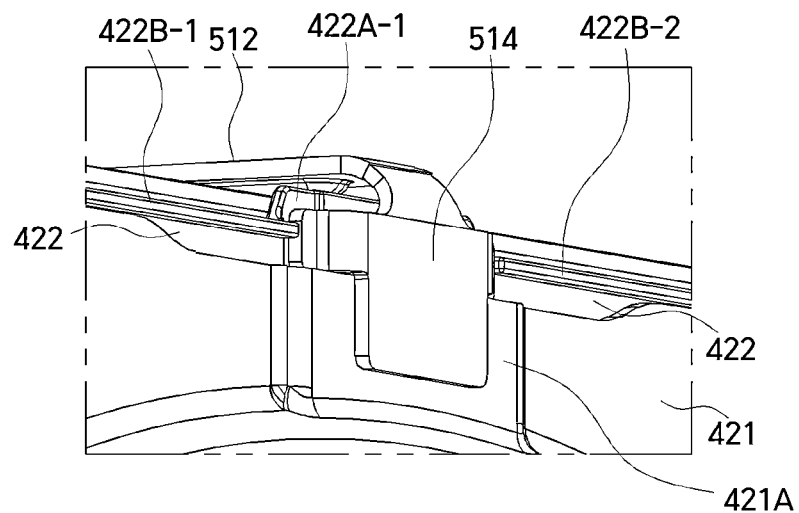

FIGS. 23A-23B are enlarged view of an example where one of both end portions of a clamp is bonded to one of upper/lower center portions of an end plate. FIG. 23A is an enlarged view as an example where one end portion of a clamp is bonded to one of upper and lower center portions thereof is seen from the front, and FIG. 23B is an enlarged perspective view.

An upper clamp 510 and a lower clamp 520 may have the same structure. For convenience of description, a description of the lower clamp 520 may be applied to a description of the upper clamp 510.

Referring to FIGS. 23A and 23B, the upper clamp 510 may include a "-"-shaped body 512, which crosses an upper portion of the cell assembly 100 and extends in a stack direction in which battery cells configuring the cell assembly 100 are stacked, and a pressing portion 514 which is bent in the same direction from both end portions of the body 512.

The pressing portion 514 included in each of both ends of the body 512 may apply pressure toward a center of the cell assembly 100 from both upper surfaces of the cell assembly 100, and thus, may generate a certain surface pressure, thereby preventing a swelling phenomenon of the cell assembly 100 and simultaneously fixing an outer dimension of the cell assembly 100.

The pressing portion 514, as illustrated in FIGS. 23A-23B, may have a tetragonal plate shape for example and may be bonded to a bonding portion 421A of an outer panel 421 on the basis of a laser welding process.

A plurality of wing portions 516 and 518 may be respectively provided at both ends of the pressing portion 514. The wings 516 and 518 may be bent in the same direction from the both end portions of the pressing portion 514 and may be mounted on the inner panel 422 which is exposed upward without being covered by the outer panel 421.

In detail, the wing portions 516 and 518 may be respectively mounted in both regions 422A-1 and 422A-2 which are defined at both sides with an upper center region 422A of the inner panel 422, corresponding to the upper bonding portion 421A of the outer panel 421, therebetween.

Moreover, a plurality of ribs 422B-1 and 422B-2 which extend horizontally in a widthwise direction of the inner panel 422 may be provided in the inner panel 422 with the wing portions 516 and 518 therebetween.

The wing portions 516 and 518 may be fixed by the ribs 422B-1 and 422B-2, and thus, may perform a guiding function not to move in a left/right direction of the clamp 510 (a widthwise direction of the inner panel 422).

Moreover, a separation distance may be between the outer panel 421 and the inner panel 422, and thus, an end portion of the upper bonding portion 421A of the outer panel 421 may contact a side surface of each the wing portions 516 and 518 on the basis of the separation distance and may perform a guiding function of fixing movement in an upward/downward direction of the clamp 510.

Referring again to FIG. 22, an opening portion 422C may be provided at a portion adjacent to an upper center region of the inner panel 422.

The opening portion 422C may upward expose a portion of a surface of a battery cell stacked on an outermost portion in the cell assembly 100. The opening portion 422C and a portion of the outer panel 421 covering the opening portion 422C may configure an accommodation space into which a temperature sensor for measuring a temperature of the cell assembly 100 to be described below is accommodated.

Figure 24A:
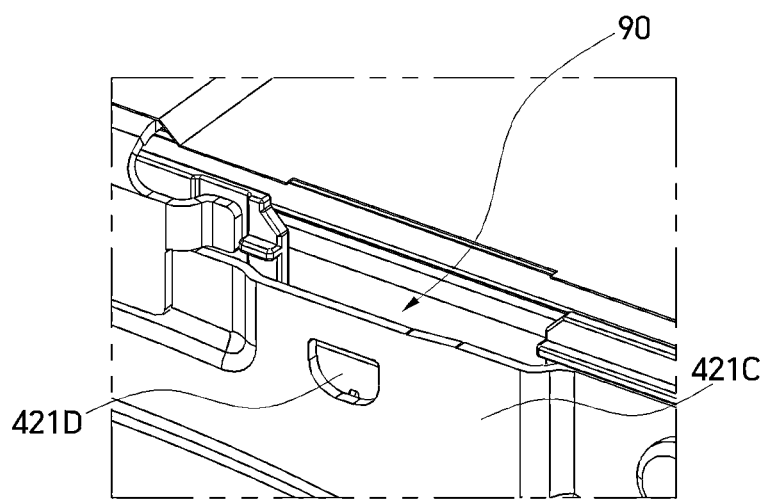
FIGS. 24A-24B are diagrams illustrating a space, into which a temperature sensor is accommodated, between a cell assembly and an end plate illustrated in FIG. 19.
Figure 24B:
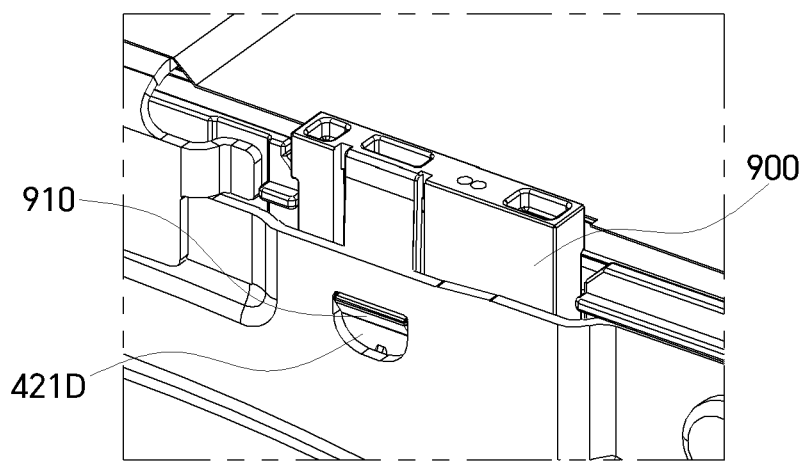

FIGS. 24A-24B are diagrams illustrating a space, into which a temperature sensor is accommodated, between a cell assembly and an end plate illustrated in FIG. 19. FIG. 24A is a diagram illustrating an example where a temperature sensor is not accommodated into an accommodation space, and FIG. 24B is a diagram illustrating an example where the temperature sensor is accommodated into the accommodation space.

Referring to FIGS. 24A-24B, as described above, a temperature sensor 900 may be accommodated into an opening portion 422C provided in an upper end portion of an inner panel 422 and an accommodation space 90 formed by a portion 421C of an outer panel 421 covering the opening portion 422C.

The opening portion 422C may upward expose a portion of a surface of a battery cell stacked on an outermost portion in a cell assembly 100, and thus, the temperature sensor 900 accommodated into the accommodation space 90 may be accommodated into the accommodation space 90 in a structure which directly contacts the battery cell stacked on the outermost portion in a cell assembly 100.

Therefore, when the temperature sensor 900 is accommodated into the accommodation space 90, the temperature sensor 900 may directly contact a surface of the cell assembly 100 exposed by the opening portion 422C, and thus, a temperature of the cell assembly 100 may be more precisely measured.

Moreover, the temperature sensor 900 may be accommodated into the accommodation space 90 in a locking structure which does not deviate from the accommodation space 90, in a state which is accommodated into the accommodation space 90.

To this end, a hanging protrusion 910 may be provided in a housing surface configuring the temperature sensor 900, and a hanging groove 421D having a half moon shape locked by the hanging protrusion 910 may be formed in a portion 421C of the outer panel 421 covering the opening portion 422C so as not to deviate in an opposite direction of a direction in which the temperature sensor 900 is inserted into the accommodation space 90.

When the temperature sensor 900 is sufficiently inserted until the hanging protrusion 910 is locked by the hanging groove 421D, mounting of the temperature sensor 900 in the accommodation space 900 may be completed.

Figure 25:
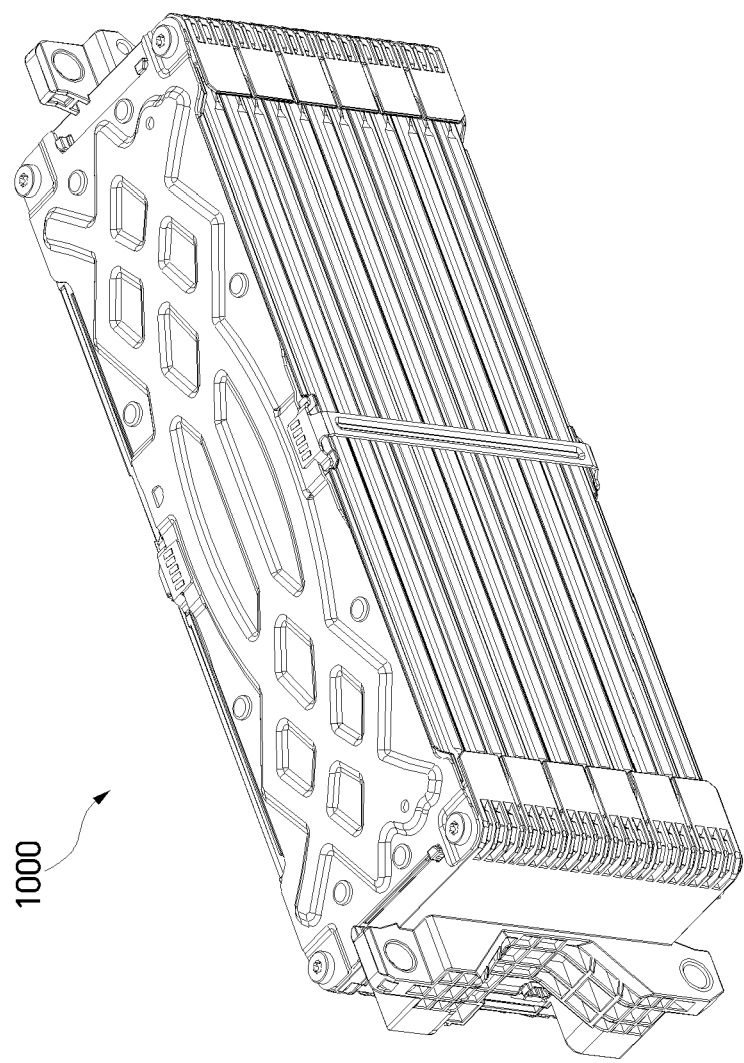
FIG. 25 is a perspective view for showing a lower shape of a final battery module assembly according to another embodiment of the present invention.

Moreover, because the cell assembly 100 according to an embodiment of the present invention is fixed by the upper and lower clamps 510 and 520 as illustrated in FIG. 25, a cartridge surrounding a battery cell may denote that a design of a separate stiff panel covering a lower portion of the cell assembly 100 is excluded. This may denote that only an upper cover 800 sufficiently acts as an element for fixing the cell assembly 100.

As described above, a design of the separate stiff panel covering the lower portion of the cell assembly 100 may be excluded, and thus, when a lower portion of the cell assembly 100 is exposed and a cooling device for cooling the cell assembly 100 is installed under the cell assembly 100, the cooling performance of the cooling device may be greatly enhanced.

Figure 26:
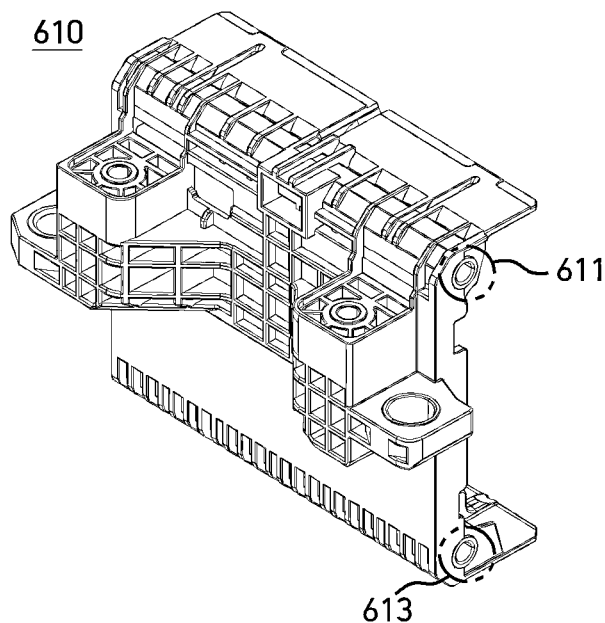
FIG. 26 is an enlarged perspective view as a front cover illustrated in FIG. 19 is seen from a forward region.
Figure 27:
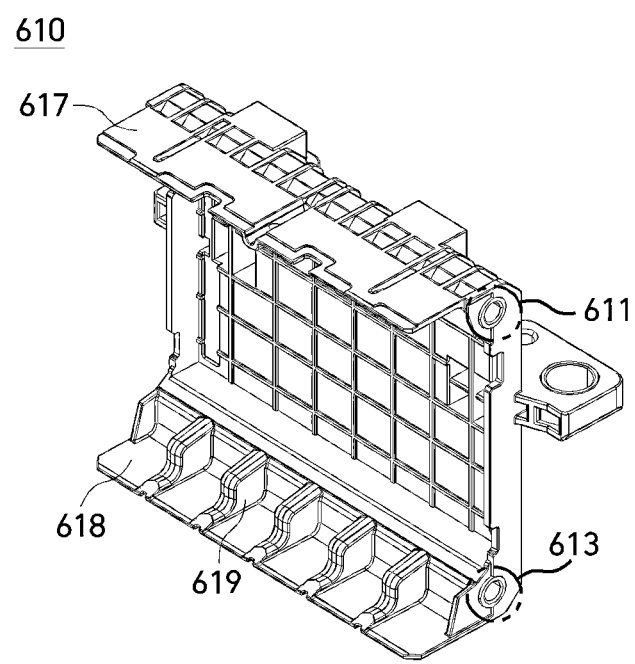
FIG. 27 is an enlarged perspective view as a front cover illustrated in FIG. 26 is seen from a rearward region.
Figure 28:
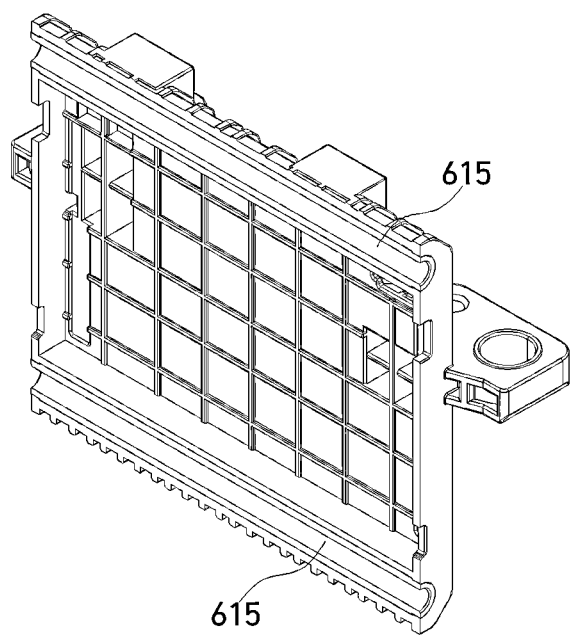
FIG. 28 is a cross-sectional view of a front cover illustrated in FIG. 27.

FIG. 26 is an enlarged perspective view as a front cover illustrated in FIG. 19 is seen from a forward region. FIG. 27 is an enlarged perspective view as a front cover illustrated in FIG. 26 is seen from a rearward region. FIG. 28 is a cross-sectional view of a front cover illustrated in FIG. 27.

A front cover 610 and a rear cover 620 may have the same structure characteristic and may merely have a slight difference in design. Accordingly, a description of the front cover 610 may be applied to a description of the rear cover 620.

Referring to FIGS. 26 to 28, a plurality of coupling holes 611 and 613 may be respectively formed in an upper end and a lower end of left and right side surfaces of the front cover 610.

As described above, the front cover 610 may be coupled to a plurality of end plates 410 and 420 by a bolt member 700 which simultaneously passes through the coupling holes 611 and 613 formed in a side surface of the front cover 610 and a plurality of coupling holes (21 and 23 of FIG. 20) formed in corner portions of the end plates 410 and 420 (or a corner portion of the outer panel 421).

In order to form the coupling holes 611 and 613 in the side surface of the front cover 610, a long hole passing through each of an upper portion and a lower portion of the front cover 610 may be formed, and a pipe 615 having a cylindrical shape may be disposed on an inner perimeter surface of the long hole.

A screw thread (a pipe screw thread) may be formed on an inner perimeter surface of each of both end portions of the pipe 615. The pipe screw thread may be coupled to a bolt screw thread of the bolt member 700 passing through the coupling holes (21 and 23 of FIG. 20) of the end plates 410 and 420 on the basis of a screw coupling method. Accordingly, the front cover 610 may be coupled to the end plates 410 and 420.

Moreover, the pipe 615 may include a solid material, for the total stiffness of the battery module assembly 1000, and for example, may include a metal material such as aluminum.

The front cover 610 may be manufactured based on a metal insert injection molding process so that a pipe is provided at each of an upper portion and a lower portion thereof.

Moreover, as illustrated in FIG. 27, a plurality of supporting portions 617 and 618 may be respectively provided at an upper portion and a lower portion of the front cover 610 in a direction toward the cell assembly 100. Bottom surfaces of the supporting portions 617 and 618 may be respectively mounted on an upper portion and a lower portion of the cell assembly 100 and may perform a guiding function of controlling the vertical movement of the front cover 610.

Moreover, a plurality of partition walls 618 may be provided on the bottom surfaces of the supporting portions 617 and 618, and battery cells (80 of FIG. 12) which are exposed without being covered by the front frame 200 may be inserted between adjacent partition walls.

The plurality of partition walls 619 may act as a bookshelf into which the battery cells (80 of FIG. 12) which are exposed without being covered by the front frame 200 are accommodated, and simultaneously, may perform a guiding function of controlling the horizontal movement of the front cover 610.

According to the embodiments of the present invention, the battery module assembly may be implemented without elements such as a bus bar and a cartridge of the related art, and thus, an assembly process may be simplified and the number of elements may be reduced, thereby reducing the cost and decreasing weight.

Moreover, according to the embodiments of the present invention, despite a reduction in the number of elements, a surface pressure of a battery cell may be maintained by using an element such as a clamp, and thus, the cell swelling phenomenon may be prevented.

Moreover, according to the embodiments of the present invention, a mounting space of a temperature sensor may be provided in a panel which covers a side surface of the battery cell, and thus, a structure for enabling the temperature sensor to directly contact the battery cell may be provided, thereby efficiently monitoring a battery cell temperature.

Accordingly, according to the embodiments, there is provided a battery module assembly in which structure materials such as a bus bar and a cartridge are removed for decreasing the process (structure) complexity, cost, weight, and size of the battery module assembly and which includes a surface pressure maintaining structure for preventing a cell swelling phenomenon.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A battery module assembly comprising:
  a cell assembly including battery cells that are stacked;
  a front frame and a rear frame respectively installed on front and rear surfaces of the cell assembly, at least one of the front frame or the rear frame including a bus bar molded therein for electrically connecting the battery cells;
  a left end plate and a right end plate respectively covering both side surfaces of the cell assembly with the cell assembly disposed therebetween;
  an upper clamp and a lower clamp respectively disposed over an upper portion and a lower portion of the cell assembly to clamp an upper portion and a lower portion of each of the left end plate and the right end plate and press both of the side surfaces of the cell assembly disposed between the left end plate and the right end plate; and
  a front cover and a rear cover respectively covering the front frame and the rear frame, the front cover and the rear cover each including:

along holes respectively formed in an upper portion and a lower portion of each of the front cover and the rear cover; and pipes having a cylindrical shape, the pipes respectively disposed on inner perimeter surfaces of the long holes.

2. The battery module assembly of claim 1, further comprising:

screw threads respectively formed on an inner perimeter surface at both ends of each of the pipes;

coupling holes respectively formed in a corner portion of each of the left end plate and the right end plate; and bolts respectively passing through the coupling holes and threaded to the screw threads, wherein the front cover and the rear cover are coupled to the left end plate and the right end plate by the threading of the bolts.

3. The battery module assembly of claim 1, wherein at least one of the pipes comprises a metal material.

4. The battery module assembly of claim 1, wherein each of the front frame and the rear frame is insert injection molded and comprises the bus bar connecting the battery cells.

5. The battery module assembly of claim 1, further comprising:

a first coupling hole Wormed in a side surface of each of the front cover and the rear cover; and a second coupling hole formed in a corner portion of each of the left end plate and the right end plate, wherein the front cover and the rear cover are coupled to the left end plate and the right end plate through a coupling member passing through the first and second coupling holes.

6. The battery module assembly of claim 1, wherein each of the left end plate and the right end plate comprises:

an outer panel comprising a metal material; and an inner panel disposed between a side surface of the cell assembly and the outer panel to insulate the cell assembly with the outer panel.

\* \* \* \* \*